United States Patent
Park et al.

(10) Patent No.: US 10,988,388 B2
(45) Date of Patent: Apr. 27, 2021

(54) STERILIZING APPARATUS

(71) Applicant: Share Light Co., LTD., Gyeonggi-do (KR)

(72) Inventors: Eun Hyun Park, Gyeonggi-do (KR); Se Young Jung, Gyeonggi-do (KR)

(73) Assignee: SHARE LIGHT CO., LTD., Gyeonggi-Do (KR)

(*) Notice: Subject to any disclaimer, the term of this patent is extended or adjusted under 35 U.S.C. 154(b) by 0 days.

(21) Appl. No.: 16/208,804

(22) Filed: Dec. 4, 2018

(65) Prior Publication Data

US 2019/0177183 A1 Jun. 13, 2019

(30) Foreign Application Priority Data

| Dec. 4, 2017 | (KR) | .................. 10-2017-0165158 |
| Feb. 12, 2018 | (KR) | .................. 10-2018-0017079 |
| Sep. 12, 2018 | (KR) | .................. 10-2018-0108774 |
| Sep. 28, 2018 | (KR) | .................. 10-2018-0116157 |

(51) Int. Cl.
*C02F 1/32* (2006.01)

(52) U.S. Cl.
CPC ........ *C02F 1/325* (2013.01); *C02F 2201/002* (2013.01); *C02F 2201/32* (2013.01); *C02F 2201/3221* (2013.01); *C02F 2201/3222* (2013.01); *C02F 2201/3227* (2013.01); *C02F 2201/3228* (2013.01); *C02F 2303/04* (2013.01)

(58) Field of Classification Search
CPC .... C02F 1/32; C02F 1/325; C02F 2201/3221; C02F 2201/3222; C02F 2201/3228; C02F 2201/3227; C02F 2201/32; C02F 2303/04; C02F 2201/002; A61L 12/10
See application file for complete search history.

(56) References Cited

U.S. PATENT DOCUMENTS

| 4,755,292 A * | 7/1988 | Merriam ................. C02F 1/325 210/192 |
| 8,975,596 B1* | 3/2015 | Matthews ............... C02F 1/325 250/432 R |
| 9,566,358 B1* | 2/2017 | Koh .......................... A61L 2/10 |
| 2011/0038754 A1* | 2/2011 | James ..................... C02F 1/325 422/24 |
| 2017/0245616 A1* | 8/2017 | Lakios ................... A45D 27/46 |
| 2019/0142981 A1 | 5/2019 | Kim et al. |

FOREIGN PATENT DOCUMENTS

| JP | H05-021951 A | 1/1993 |
| JP | 2017-169945 A | 9/2017 |
| JP | 2017-170341 A | 9/2017 |
| KR | 10-2000-0060553 A | 10/2000 |
| KR | 10-2005-0115348 A | 12/2005 |
| KR | 10-2007-0022095 A | 2/2007 |
| KR | 10-2011-0098394 A | 9/2011 |

(Continued)

*Primary Examiner* — Lessanework Seifu
(74) *Attorney, Agent, or Firm* — Harness, Dickey & Pierce, P.L.C.

(57) ABSTRACT

Disclosed is a sterilization apparatus including: a semiconductor UV (ultraviolet) light emitting diode; and a case including an upper section with an internal space and an entrance opening, a bottom face opposite to the entrance opening, and a lateral face connecting the bottom face and the upper section.

8 Claims, 24 Drawing Sheets

(56) References Cited

FOREIGN PATENT DOCUMENTS

| | | |
|---|---|---|
| KR | 10-2011-0112712 A | 10/2011 |
| KR | 10-2012-0054417 A | 5/2012 |
| KR | 10-2013-0135675 A | 12/2013 |
| KR | 10-2014-0028513 A | 3/2014 |
| KR | 10-2015-0029092 A | 3/2015 |
| KR | 20-2015-0002677 U | 7/2015 |
| KR | 10-2017-0142241 A | 12/2017 |
| WO | WO-2016/189800 A1 | 12/2016 |

* cited by examiner

Prior Art

STERILIZING APPARATUS

CROSS REFERENCE TO RELATED APPLICATIONS

This application claims priority to Korean Patent Application Nos. 10-2017-0165158, filed on 4 Dec. 2017, 10-2018-0017079, filed on 12 Feb. 2018, 10-2018-0108774, filed on 12 Sep. 2018, and 10-2018-0116157, filed on 28 Sep. 2018. The entire disclosure of the application identified in this paragraph is incorporated herein by references.

FIELD

The present disclosure relates generally to a sterilizing apparatus, and in particular, to a portable sterilizing apparatus.

BACKGROUND

This section provides background information related to the present disclosure which is not necessarily prior art.

FIG. 1 shows a structural example of an ultraviolet (UV) lamp described in Korean Unexamined Utility Model Publication No. 20-2015-0002677.

The UV lamp 5 shown in FIG. 1 includes an electrode 2 at each end, a filament 3 at each end, and a glass tube 1, and its surface is partially coated with a UV blocking substance 4. Therefore, emission of ultraviolet light is blocked 6 in the direction where the UV blocking substance 4 is applied. FIG. 1 is a top view for describing operating principles of the UV lamp 5. The filament 3 for emitting thermoelectrons is provided at each end of the glass tube 1. When heated, the filament 3 readily emits electrons.

A current flows when a potential difference is induced at the filaments 3 at both ends. As the current travels, electrons 8 excite mercury vapor 9 during their migration, and the excited mercury vapor 9 drops to a ground state, emitting ultraviolet radiation 7. A part of the surface of the glass tube 1 blocks ultraviolet radiation 7 by the UV blocking substance 4 coated on the part, while the other part of the surface of the glass tube 1 emits ultraviolet radiation therethrough.

The UV lamp 5 is bulky and consumes a lot of power. A sterilization apparatus equipped with the UV lamp 5 is accordingly bulky and has high power consumption to be used for self-powered generation. These make such a sterilization apparatus less attractive for use as a portable unit and fir self-powered generation.

FIG. 2 shows an example of a UV sterilization system described in Korean Unexamined Patent Publication No. 10-2005-0115348. This sterilization system is for sterilizing water kept in a water storage tank by a UV sterilization lamp. However, since water inside the tank is very calm and does not move around, some portion of the water farther from the UV sterilization lamp will be less sterilized and even get a possible secondary contamination. In order to resolve the problems, this invention adopted a circulation pump in the water storage tank to create forced circulation of purified water in the tank. By doing so, the system of this invention can always provide consistent and uniform sterilization effects. Here, the system includes an inlet 1 through which purified water enters, a water storage tank 2 where the water entered is stored, a precipitating UV sterilization lamp 3 in charge of sterilization, a circulation pump 5 for creating forced circulation of the water in the storage tank, a return pipeline 4 via which water discharged from the circulation pump 5 returns to the water storage tank 2, and an exit 6 connected to a serving line. The circulation pump 5 operates periodically by a timer such that its forced circulation inside the water storage tank 2 can guarantee consistent and uniform UV sterilization effects.

FIG. 3 shows an example of a UV water sterilizer described in Korean Unexamined Patent Publication No. 10-2014-0028513.

In this UV water sterilizer, a gap between a horn shaped tube and installation openings of an end plate placed at an end of a sterilization housing is sealed by welding, and an epoxy resin is filled into a gap between the horn shaped tube and a quartz tube to seal them together and further to prevent the occurrence of water leakage due to water pressure at a location where the quartz tube is installed. The UV water sterilizer of this invention is intended to use UV radiation for sterilizing the water in a water tank or a bathtub in a public bathroom setting, and includes a sterilization housing 10 having an inlet 11 and an outlet 12, end plates 20 and 30 to close and seal both ends of the sterilization housing 10, a quartz tube 40 having one end sealed to be put into a plurality of installation openings (not shown) that is formed in one 20 of the end plates, and a horn shaped tube 50 placed at the quartz tube 40, between the installation opening and the quartz tube 40. The horn shape tube 50 is welded along the peripheral of a corresponding installation opening so that the horn shape tube 50 and the installation opening are sealed to each other by a welding part (not shown). Also, an epoxy resin (not shown) is filled into a gap between the horn shaped tube 50 and the quartz tube 40 such that the quartz 40 is fixed to the horn shaped tube 50 and they are sealed together. Moreover, a stopper (not shown) fits an opening of the quartz tube 40, and one end of a UV lamp 80 that is put into the opening of the quartz tube 40 is inserted and secured in a central hole (not shown) of the stopper.

However, such a UV lamp installed inside the water requires a water-proof or water-resistant quartz tube 40 to transmit ultraviolet light therethrough, as shown in FIG. 2. This is intended because high quality and high cost materials of a quartz, sapphire or crystal configuration can transmit ultraviolet light therethrough. Since additional designing needs to be done to prevent water leakage and secondary contaminations as illustrate in FIG. 2, the overall cost for the system is increased accordingly.

Therefore, there is a need for a cost-efficient and simple-structure system that can sterilize viruses and bacteria present in water and supply drinking water to people in places without an access to electricity as well as in other remote areas.

SUMMARY

Technical Problem

The problems to be solved by the present disclosure will be described in the latter part of the best mode for carrying out the invention.

Technical Solution

This section provides a general summary of the present disclosure and is not a comprehensive disclosure of its full scope or all of its features.

According to one aspect of the present disclosure, a sterilization apparatus includes: a semiconductor UV (ultraviolet) light emitting diode; and a case including an upper section with an internal space and an entrance opening, a bottom face opposite to the entrance opening, and a lateral face connecting the bottom face and the upper section, in which the semiconductor light emitting diode is arranged in the internal space.

According to another aspect of the present disclosure, a sterilization apparatus includes: a case having an entrance opening facing downward, the case defining a first internal space; a semiconductor UV light emitting diode arranged in the first internal space of the case, for emitting ultraviolet light towards the entrance opening of the case; and a generator including a handle for supplying electricity to the semiconductor light emitting diode.

According to another aspect of the present disclosure, a sterilization apparatus includes: a case; a semiconductor UV light emitting diode arranged in the case; a generator arranged in the case and adapted to supply electricity to the semiconductor light emitting diode; and a container joined with the case, the container having an inner face and a height measured from the bottom, in which the semiconductor light emitting diode emits ultraviolet light towards the inner face of the container, and the ultraviolet light is prevented from escaping to the outside of the container.

According to another aspect of the present disclosure, a water sterilization apparatus includes: a body having an internal space to be filled with water; a cover adapted to cover the internal space; and a light source arranged in the cover, the light source emitting ultraviolet light and receiving power after the cover is closed over the body.

Advantageous Effects

The advantageous effects of the present disclosure will be described in the latter part of the best mode for carrying out the invention.

DETAILED DESCRIPTION

The present disclosure will now be described in detail with reference to the accompanying drawing(s). The detailed description herein is presented for purposes of illustration only and not of limitation.

Figure 4:
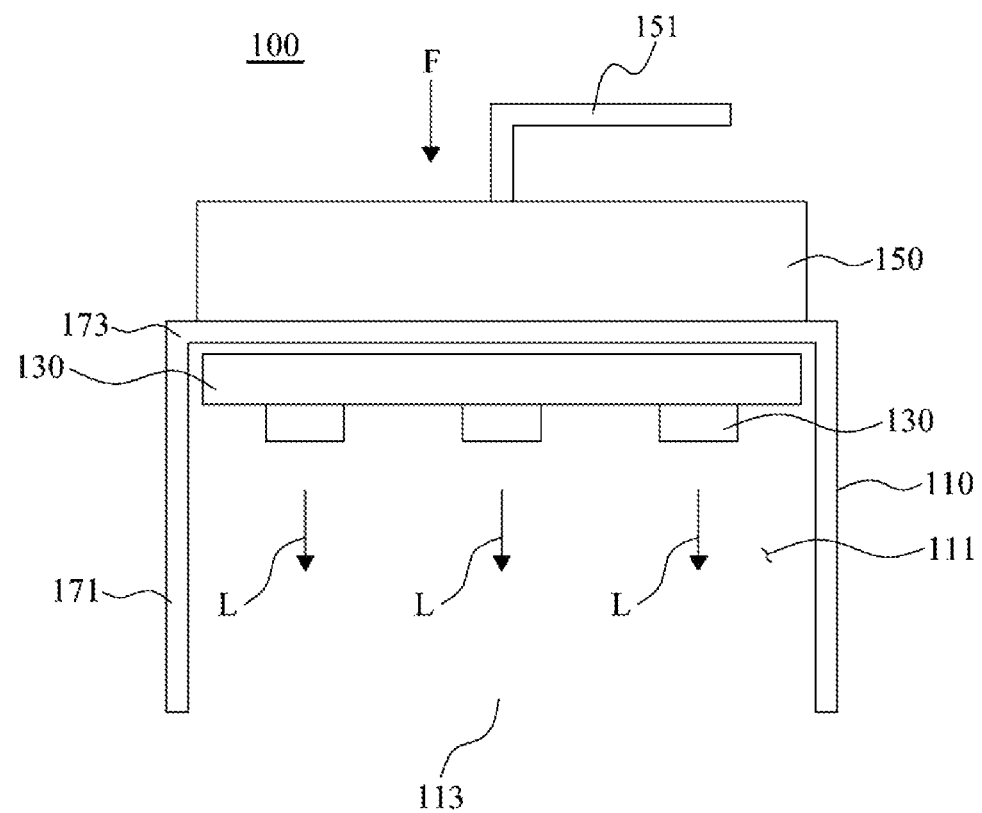
FIG. 4 and FIG. 5 show exemplary embodiments of a sterilization apparatus according to the present disclosure.
Figure 5:
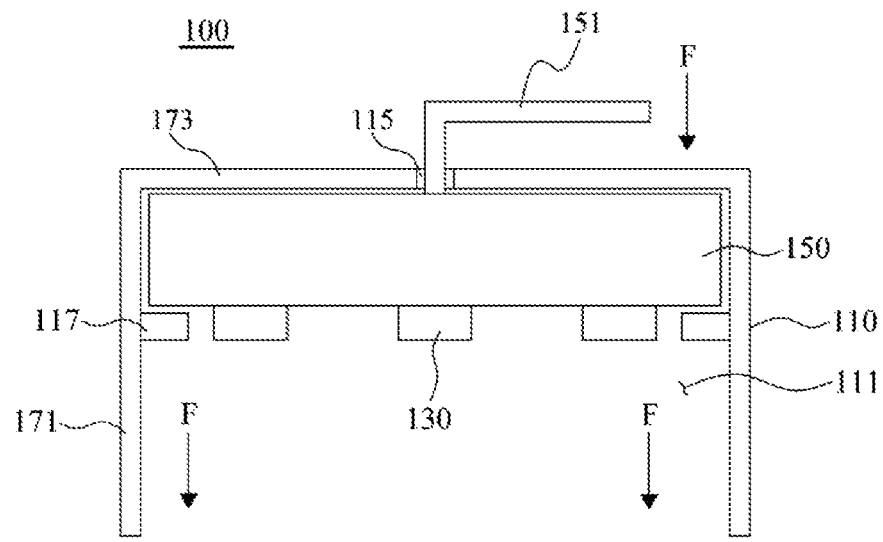

FIG. 4 and FIG. 5 show exemplary embodiments of a sterilization apparatus 100 according to the present disclosure.

The sterilization apparatus includes a case 110, semiconductor light emitting diode(s) 130, and an (electric) generator 150. The case 110 has a top face 173 and lateral faces 171, and includes a first internal space 111 defined by the top and lateral faces 173 and 171 surrounding the space. The first internal space 111 has an entrance opening 113 under the case 110. The semiconductor light emitting diode(s) 130 is provided in the first internal space 111 of the case 110, and emit ultraviolet light L towards the entrance opening 113 of the case 110. The generator 150 is disposed above the semiconductor light emitting diode(s) 130 and provides electricity to the semiconductor light emitting diode(s) 130. The generator 150, which is fixed to the case 110, has a handle 151.

In one example, the handle 151 can be arranged on top of the generator 150. When a force F is generated by the handle 151 to run the generator 150, the force F is then transferred to the case 110 by the generator 150. This force F transferred to the case 110 is a force F applied to the handle 151 to run the generator 150, or a pressing force F applied to the generator 150. The force F is directed towards the entrance opening of the case 110, pressing the case 110 to that direction. Because of this pressing force 110 applied the case 110, no light escapes from the case 110, and the first internal space 111 is tightly sealed and shut out from the outside, which in turn improves the sterilization performance in the first internal space 111.

A vertically directed attachment can be used, in extension of the end of the handle 151 in the drawings, in order to facilitate rotation of the generator 150.

In particular, FIG. 4 and FIG. 5 illustrate the generators 150 arranged over and under the top face 173 of the case 110, respectively.

When the generator 150 is arranged over the top face 173 of the case 110, the force F applied to the handle 151 to run the generator 150 is transferred to the case 110. The semiconductor light emitting diode(s) 130 can be provided on a substrate.

FIG. 4 shows an example where the generator 150 arranged over the top face 173 of the case 110. The force F applied to run the generator 150 on the top face 173 passes through the top face 173 and is transferred in the direction of the entrance opening.

FIG. 5 shows an example where the generator 150 is arranged in the first internal space 111 under the top face 173 of the case 110. The top face 173 of the case 110 has a hole 115, which the handle 150 goes through and is connected to the generator 150. There are rests 117, allowing the generator 150 to be kept in the first internal space 111 of the case 110 such that the force F applied to the handle 151 can be transferred from the generator 150 to the case 110. In other words, the force applied to the handle 151 is transferred through the rests 117 in the direction of the entrance opening of the case 110. The rests 117 can be designed to be protruded from the case 110 towards the first internal space 111.

The semiconductor light emitting diode(s) 130 can be attached to the bottom side of the generator 150.

Moreover, the sterilization apparatus 100 can include a tilt sensor that serves as a safety system. Therefore, if the sterilization apparatus 100 is tilted or has been turned upside down and the generator 150 is run nonetheless, the semiconductor light emitting diode(s) 130 is prevented from emitting ultraviolet light under this circumstance.

Figure 6:
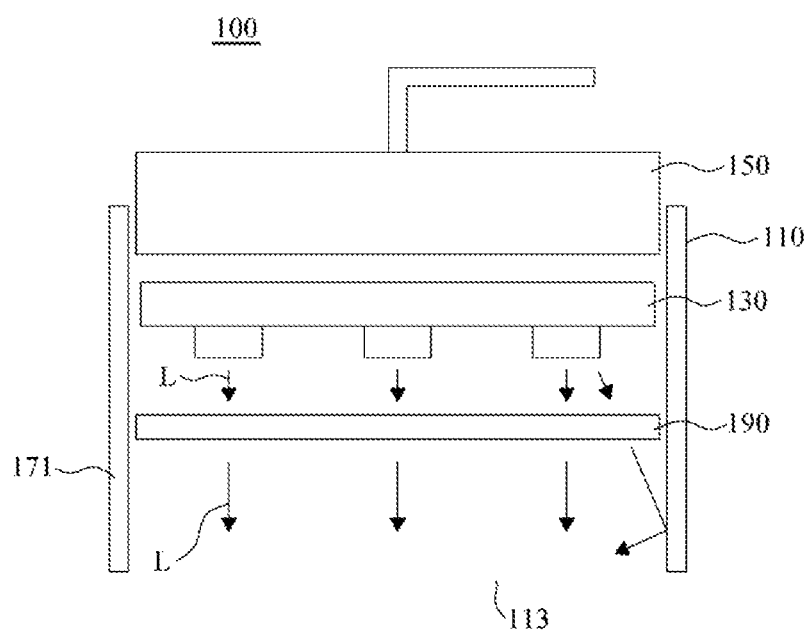
FIG. 6 shows another exemplary embodiment of a sterilization apparatus according to the present disclosure.

FIG. 6 shows another exemplary embodiment of a sterilization apparatus according to the present disclosure.

In this sterilization apparatus, the case 110 has only lateral faces 171. The generator 150 is provided in place of the top face 173 of the case 110. The generator 150 is positioned to come in contact with the case 110, and ultraviolet light L from the semiconductor light emitting diode(s) 130 is emitted towards the entrance opening 113 of the case 110.

The sterilization apparatus 100 further includes a window 190. The window 190 is located between the entrance opening 113 of the case 110 and the semiconductor light emitting diode(s) 130, and can serve to protect the semiconductor light emitting diode(s) 130. Additionally, the window 190 serves to prevent light emitting elements from getting contaminated by a sterilization target substance present below, and to prevent a damage or malfunction of a drive circuit as an electrical-conducting material such as water is splashed into the drive circuit. Also, water-proof effects can be obtained by tightly attaching the window 190 to the case. The window 190 can be light-transmitting. Preferably, the window 190 is made of sapphire or quartz because such a sapphire or quartz window 190 can transmit ultraviolet light therethrough.

The window 190 is arranged at a distance from the entrance opening 113 of the case 110. The lateral faces 171 of the sterilization apparatus 110 ensure that the ultraviolet light L does not escape through them, and protect the window 190 located inwardly of the entrance opening 113 from an external shock.

Figure 7:
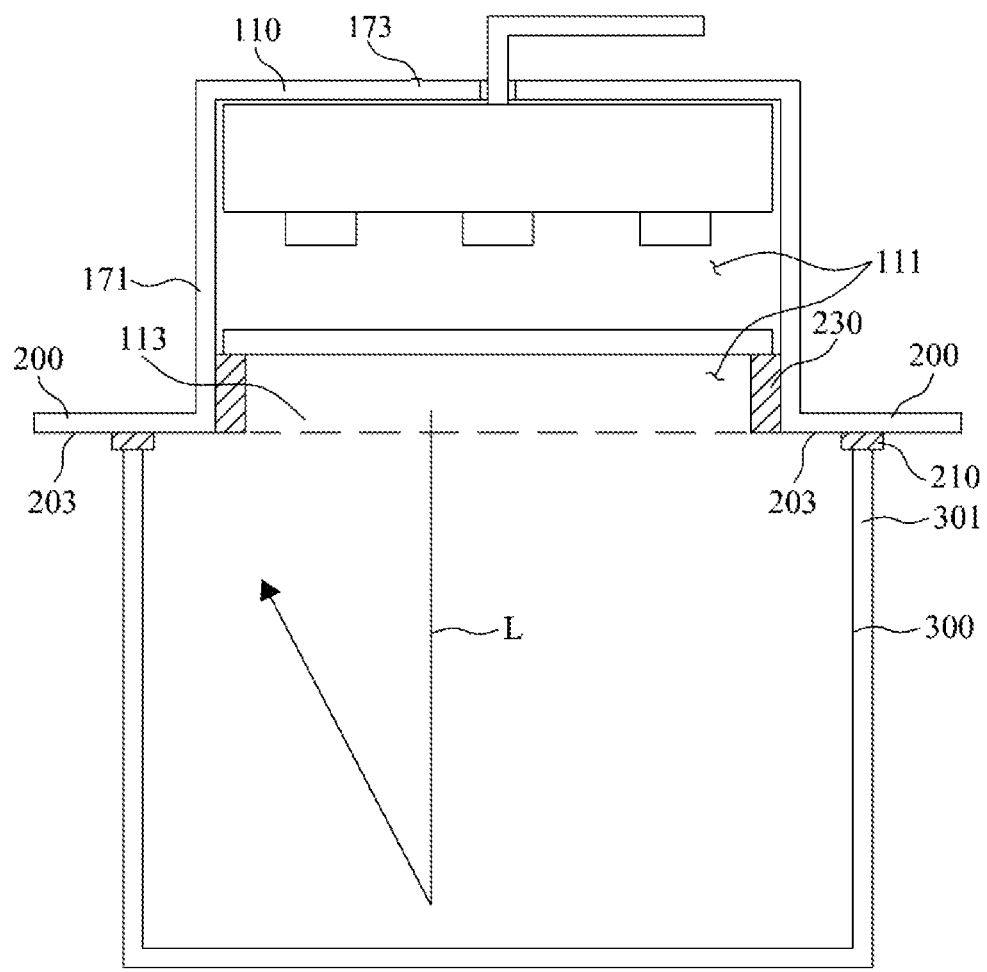
FIG. 7 and FIG. 8 show other exemplary embodiments of a sterilization apparatus according to the present disclosure.
Figure 8:
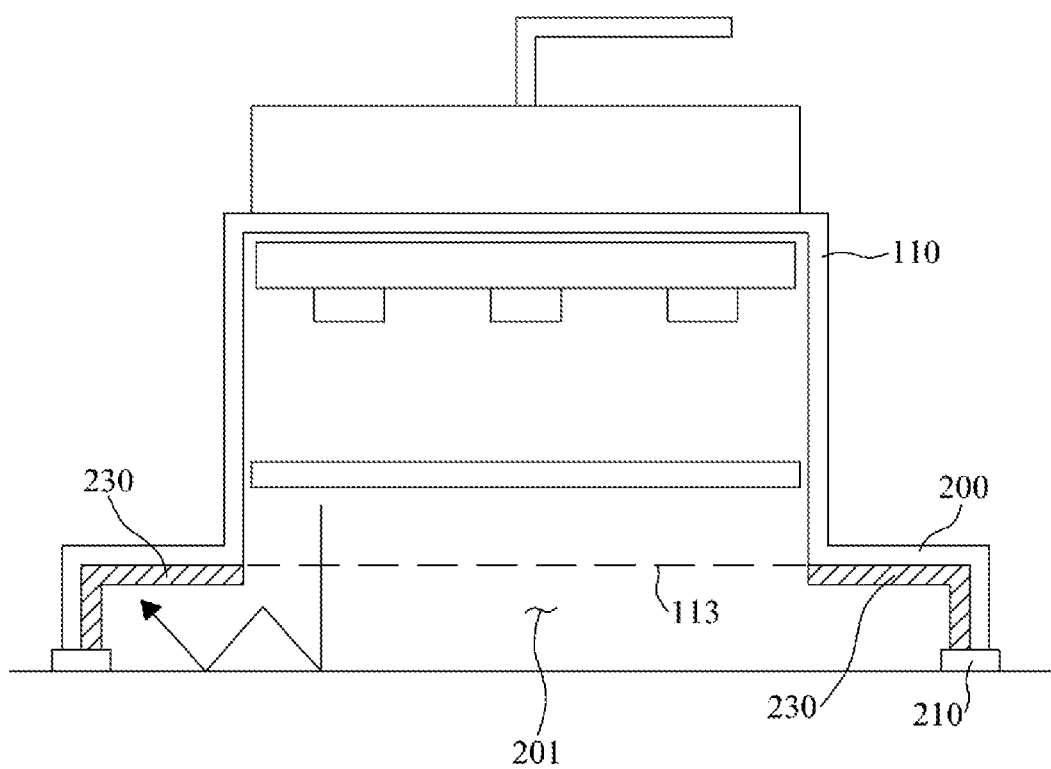

FIG. 7 and FIG. 8 show other exemplary embodiments of a sterilization apparatus according to the present disclosure.

The sterilization apparatus includes a barrier 200, which is sufficiently extended outwards from the entrance opening 113 in the lateral direction of the case 110 to keep the light L from reflecting to the top face 173 of the case 110. The barrier 200 can be protruded from the case 110.

The barrier 200 may be integrally formed with the case 110 as a single piece, or may be formed separately from the case 110.

In one example, when the sterilization apparatus 100 comes into contact with a water container 300 for sterilization, the barrier 200 of the sterilization apparatus 100 is brought into contact with the water container 300. The barrier 200 has a seal 210 at a contact region between the barrier 200 and an inlet 301 of the water container 300. The seal 210 is closely adhered to the inlet 301 of the water container 300 such that ultraviolet light from the semiconductor light emitting diode(s) 130 may not escape through a space between the barrier 200 and the inlet 301 of the water container 300. The seal 210 can have a varying shape to accommodate to the force F transferred to the case 110 and further to the barrier 200, enhancing adhesion of the seal 210 to the inlet 301 of the water container 300.

The seal 210 is provided to partial or all of a bottom face 203 of the barrier 200. The seal 210 can be made of an elastic material. For instance, the seal 210 can be made of rubber or silicone materials.

The lateral faces 171 defining the first internal space 111 of the case 110 may have reflectors 230 for reflecting light. As such, the light leaving the first internal space 111 can be reflected, instead of being absorbed in the first internal space 111, and emitted more in the direction of the entrance opening 113.

The semiconductor light emitting diode(s) 130 can be provided to the generator 150 as illustrated in FIG. 7.

The barrier 200 can be formed as illustrated in FIG. 8, and a second internal space 201 is defined by the barrier 200 surrounding the space. The barrier 200 in the form shown in FIG. 8 can be used when a target face to be sterilized is wider than the entrance opening 113 of FIG. 5. Reflectors 230 may be arranged at the barrier 200 that defines the second internal space 201. Therefore, ultraviolet light emitting from the semiconductor light emitting diode(s) 130 is spread into the second internal space 201, allowing more areas to be sterilized by the ultraviolet light.

Figure 9:
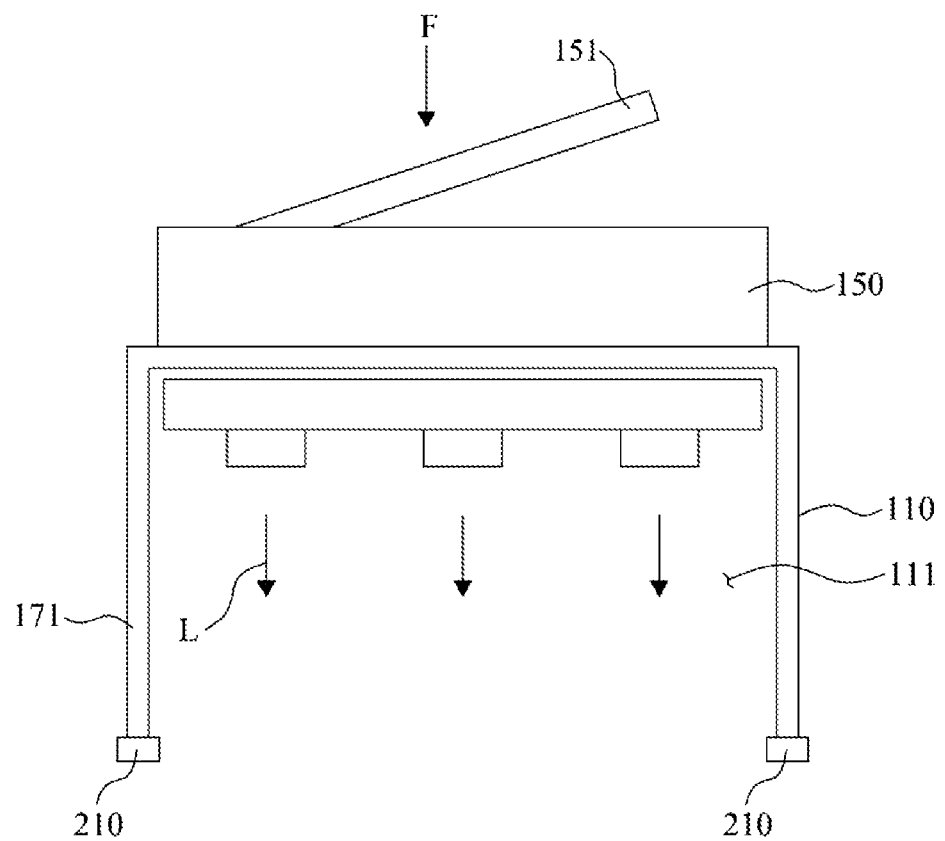
FIG. 9 shows another exemplary embodiment of a sterilization apparatus according to the present disclosure.

FIG. 9 shows another exemplary embodiment of a sterilization apparatus according to the present disclosure.

The handle 151 for running the generator 150 is pushed down in the emission direction of ultraviolet light L. In other words, the generator 150 starts generating electricity when the handle 151 of the generator 150 is pushed down. The force F applied to the handle 151 of the generator 150 is transferred to the generator 150, and further to the case 110 as the generator 150 and the case 110 are tightly attached together. Seals 210, if available, at the lateral faces 171 of the case 110 get tightly adhered by the force pressing against the case 110 so that the first internal space 111 can be more airtight. Moreover, because air cannot get through this more airtight, first internal space 111 and because the ultraviolet light L does not escape to the outside of the case 110, sterilization effectiveness will increase even more.

Figure 10A:
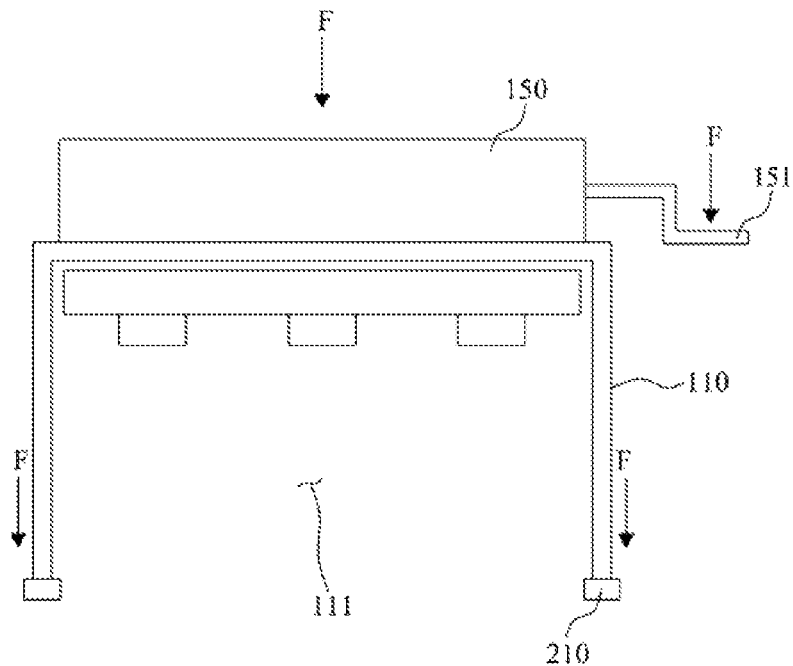
FIGS. 10a and 10b show other exemplary embodiments of a sterilization apparatus according to the present disclosure.
Figure 10B:
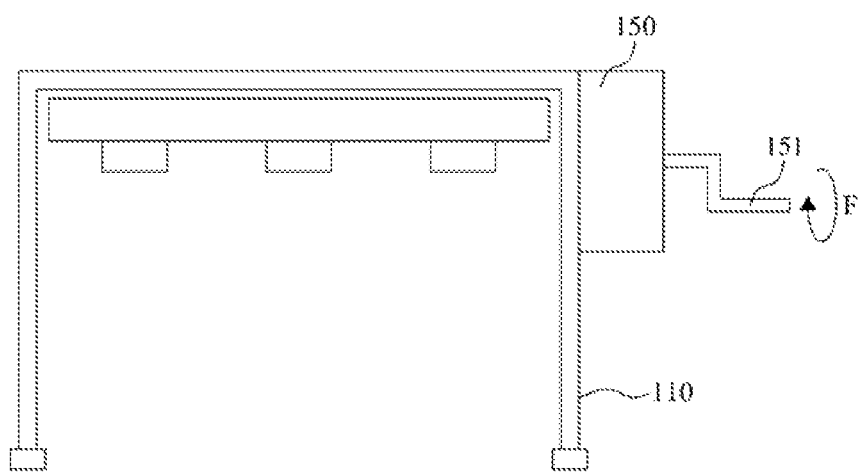

FIG. 10 shows other exemplary embodiments of a sterilization apparatus according to the present disclosure.

FIG. 10(*a*) is an example where the handle 151 is arranged at a lateral face of the generator 150.

In one example, a person may use one hand to push down the handle 151 placed at the lateral face of the generator 150 in order to run the generator 150, and use the other hand to press down the generator 150, allowing a force F to be transferred to the generator 150. Another force F may be applied to press down the seals 210 of the case 110 to get a more airtight, first internal space 111. As it is a hand that presses down the generator 150, the case 110 can be stably pressed as well.

FIG. 10(*b*) is an example where the generator 150 is arranged at a lateral face of the case 110. A force F used for turning or pushing down the handle 151 to operate the generator 150 is transferred to the case 110 as the generator 150 can be arranged in contact with the case 110. Preferably, the generator 150 is placed at the location where it can transfer the force of the handle 151 to the case 110.

Figure 11A:
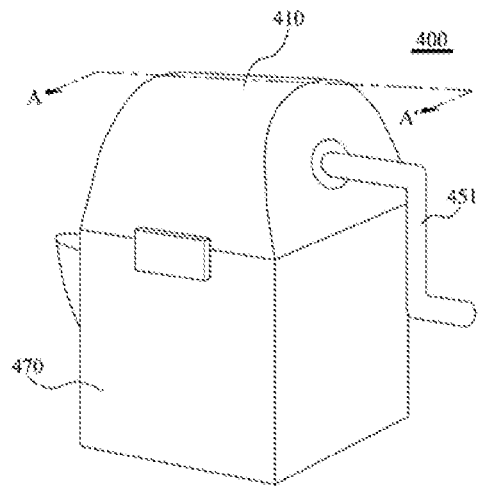
FIGS. 11a and 11b show another exemplary embodiment of a sterilization apparatus according to the present disclosure.
Figure 11B:
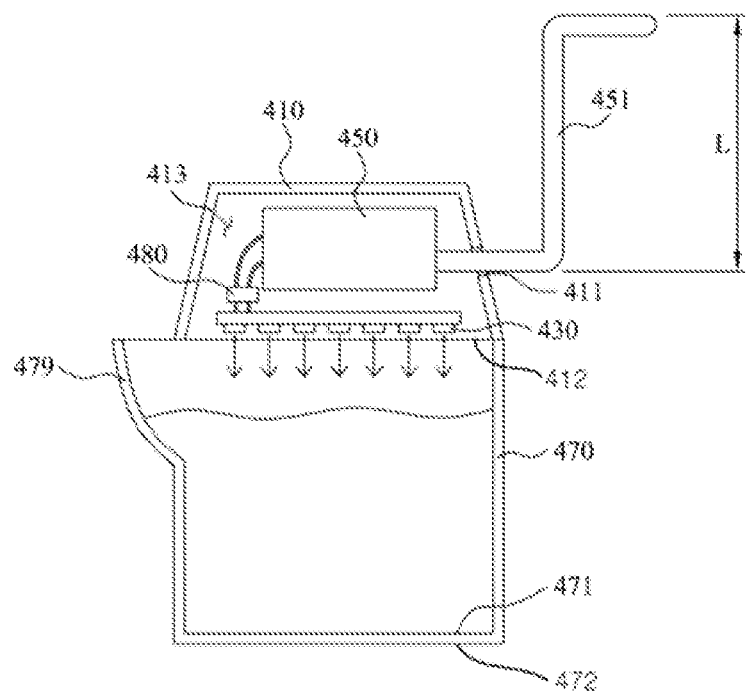

FIG. 11 shows another exemplary embodiment of a sterilization apparatus according to the present disclosure.

FIG. 11(*a*) is a perspective view of a sterilization apparatus 400 according to the present disclosure, and FIG. 11(*b*) is a cross sectional view along AA' of FIG. 11(*a*).

The sterilization apparatus 400 includes a case 410, semiconductor light emitting diode(s) 430, a generator 450, and a container 470.

The case 410 is arranged over the container 470. The case 410 includes the semiconductor light emitting diode(s) 430 and the generator 450. In particular, the case 410 includes the semiconductor light emitting diode(s) 430 and the generator 450 in its internal space 413.

Preferably, the semiconductor light emitting diode(s) 430 is a UV LED (Light Emitting Diode) because such light emitting diodes 430 have low power consumption and thus they are capable of emitting light with a less amount of current. The semiconductor light emitting diode(s) 430 is electrically connected to the generator 450, and the current produced by the generator 450 can operate the semiconductor light emitting diode(s) 430.

The generator 450 is preferably a self-powered electric generator, which is manually turned or rotated by a person and produces electricity. Even if there are multiple, more than one, semiconductor light emitting diodes 430, they have low power consumption such that they can still be turned on by manual labor. To be self-powered, the generator 450 needs a handle 451. When a person holds and turns this handle 451, the generator 450 starts producing electricity. Preferably, the handle 451 has a length L that falls between a bottom face 412 of the case 410 and a bottom face 472 of the container 470. If the length L of the handle 451 falls above the bottom face 412 of the case 410, more force is required to rotate the handle 451, which possibly can make the sterilization apparatus 400 move and topple over. On the other hand, if the length L of the handle 451 falls below the bottom face 472 of the container 470, rotational motion of the handle 451 might be hindered. This explains why the handle 451 is preferably located higher than the bottom face 472 of the container 470. In short, to rotate the handle 451 with little force and to facilitate the operation of the generator 450 for producing electricity, the length L of the handle 451 should preferably fall between the bottom face 412 of the case 410 and the bottom face 472 of the container 470.

The container 470 has an inner face 471. At least one semiconductor light emitting diode 430 radiates and emit light towards the inner face 471 of the container 470. Water is usually kept inside the container 470, but any other items that need to be sterilized can be placed in the container 470.

The container 470 is made of plastics not to transmit ultraviolet light therethrough such that people can be protected from getting injured by ultraviolet light. Even though the container 470 can be made of glass, it can easily be broken and is heavy, making it less convenient to carry around than a plastic container. Nevertheless, any materials that are transparent to see inside the container 470 and that do not transmit ultraviolet light therethrough can be used without limitation.

The container 470 can have a spout 479. When liquid is in the container 470, the spout 479 ensures that the liquid is poured out or drained without being spilled.

The handle 451 of the generator 450 is found on the outside of the case 410. Therefore, the case 410 has a hole 411, through which the handle 451 on the outside of the case 410 can be connected with the generator 450 inside the case 410.

Further, the sterilization apparatus 400 can further include a timer 480 in order to stop continued operation of the generator 450 for more than a predefined period of time. In one example, the timer 480 is placed between the semiconductor light emitting diode(s) 430 and the generator 450. If the generator 450 had already been used for the predefined period of time, the timer 480 can cut off the electrical connection between the semiconductor light emitting diode(s) 430 and the generator 450. After cutting off the electrical connection for the predefined period of time, the timer 480 can made the electrical connection work again. With the timer 480, one can prevent overheating of the semiconductor light emitting diode(s) 430 or generator 450. Preferably, the timer 480 is set to allow sufficient time for sterilizing the interior area of the container 470. Although the timer 480 is connected to two lines in FIG. 11(*b*), it can be connected in any other ways without limitations, in order to operate to stop overheating.

Figure 12A:
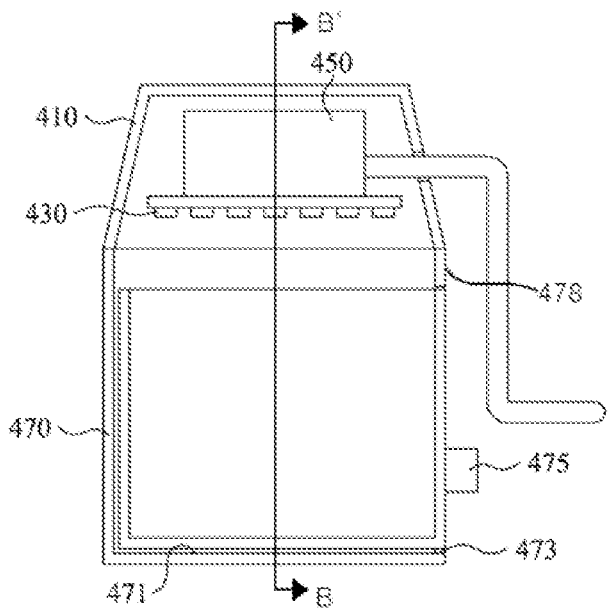
FIGS. 12a and 12b show another exemplary embodiment of a sterilization apparatus according to the present disclosure.
Figure 12B:
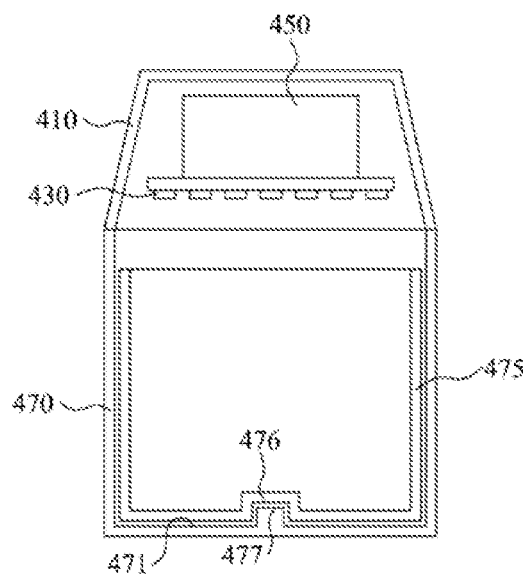

FIG. 12 shows another exemplary embodiment of a sterilization apparatus according to the present disclosure.

FIG. 12(*a*) is a cross sectional view similar to FIG. 11(*b*), showing another example of the sterilization apparatus 400 according to the present disclosure. FIG. 12(*b*) is a cross sectional view along BB' of FIG. 12(*a*).

The container 470 here has a drawer 475. A lateral face 478 of the container 470 has an entrance slit 473, through which the drawer 475 can be slid into or out of the container 470.

For example, the inner face 471 of the container 470 can have a bump portion 477, which is received into a recessed portion formed on the drawer 475. As the bump portion 477 is received into the recessed portion 476, the drawer 475 can move along the bump portion 477. The recessed portion 476 and the bump portion 477 can be switched over each other.

Figure 13A:
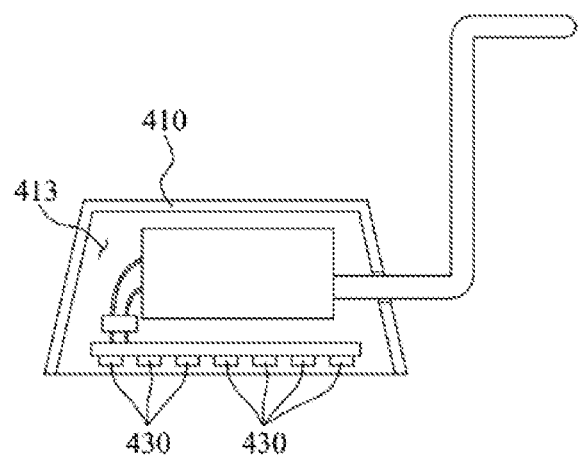
FIGS. 13a, 13b and 13c show another exemplary embodiment of a sterilization apparatus according to the present disclosure.
Figure 13B:
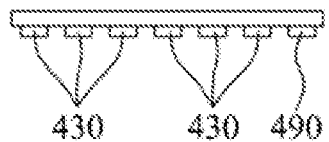

FIG. 13 shows another exemplary embodiment of a sterilization apparatus according to the present disclosure.

Referring to FIG. 13(*a*), semiconductor light emitting diodes 430 provided in the internal space 413 of the case 410 emit ultraviolet light.

Referring to FIG. 13(*b*), similar to the semiconductor light emitting diodes 430, an alarm unit 490 capable of emitting visible light can also be provided.

Since ultraviolet light is not visible to the naked eye, even when the semiconductor UV light emitting diodes 430 are turned on, it is difficult to see whether the semiconductor light emitting diodes 430 are operating. The alarm unit 490 can be a semiconductor light emitting diode 430 that emits visible light, or that emits both visible light and ultraviolet light at the same time. The alarm unit 490 can be placed at any position.

Figure 13C:
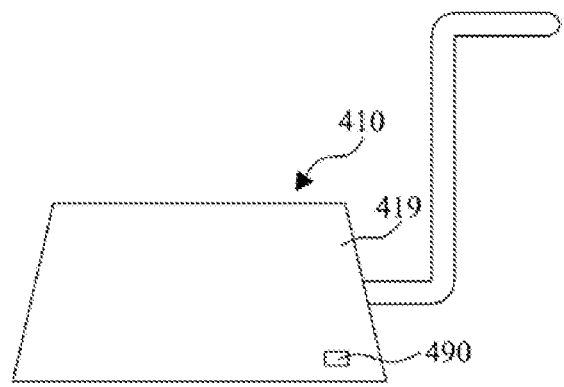

As shown in FIG. 13(c), the alarm unit 490 is arranged on an outer face 419 of the case 410, and emits visible light. Since the alarm unit 490 emitting visible light is placed on the outer face 419 of the case 410, it is possible to see from outside whether the semiconductor light emitting diode(s) 430 is operating. Therefore, the container 470 does not necessarily have to be transparent in this case.

Figure 14A:
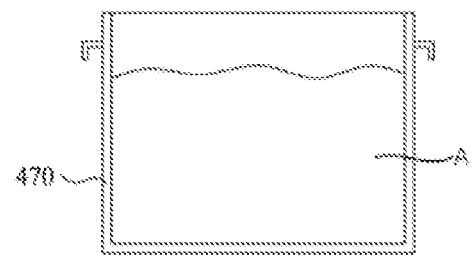
FIGS. 14a, 14b and 14c illustrate an exemplary method of using a sterilization apparatus according to the present disclosure.
Figure 14B:
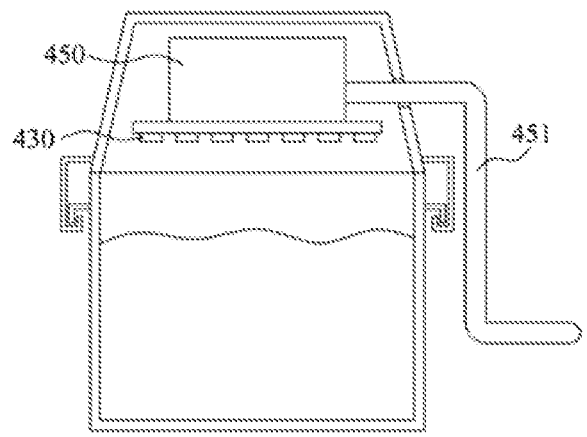
Figure 14C:
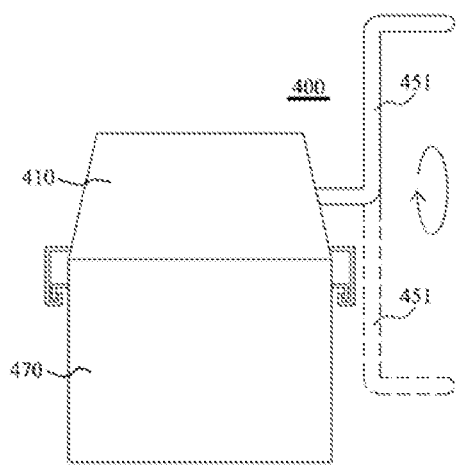

FIG. 14 illustrates an exemplary method of using a sterilization apparatus according to the present disclosure.

First of all, a sterilization item A is placed in the container 470. The sterilization item A can be any of objects or materials that need to be sterilized. For instance, the sterilization item A can be water, a baby product, a cell phone or the like.

The container 470 and the case 410 are fixed. That is, the case 410 is placed over the container 470, and both are immobilized so that the container 470 and the case 410 cannot move separately.

Next, the generator 450 is run, and a current is produced by the generator 450. The semiconductor light emitting diode(s) 430 is then turned on, and the sterilization item A is sterilized. To run the generator 450, a user holds and rotates the handle 451 of the generator 450 with one hand, and presses down the case 410 with the other hand, such that the sterilization apparatus 400 is pressed and immobilized, and the case 410 and the container 470 can therefore be fixed.

Once the sterilization item A in the container 470 is sterilized, the container 470 and the case 410 are separated. The sterilization item A in the container 470 is then stored or used.

Figure 15A:
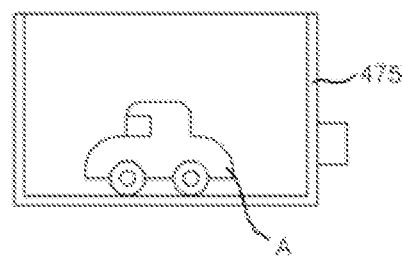
FIGS. 15a, 15b and 15c illustrate another exemplary method of using a sterilization apparatus according to the present disclosure.
Figure 15B:
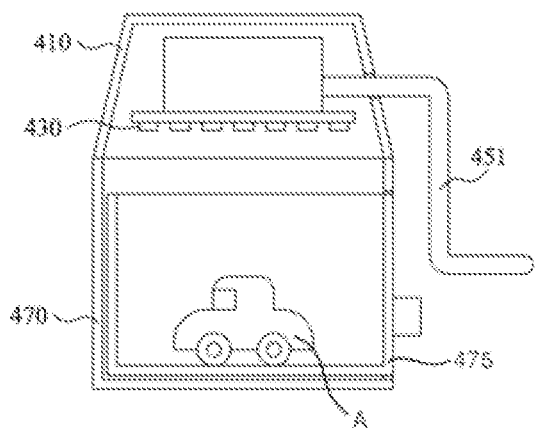
Figure 15C:
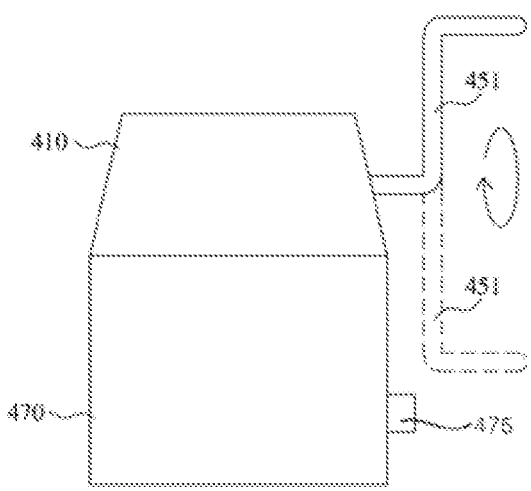

FIG. 15 illustrates another exemplary method of using a sterilization apparatus according to the present disclosure.

First of all, a sterilization item A is placed in the drawer 475.

The drawer 475 is then put in the container 470. The drawer 475 can be fixed to the container 470.

Next, the generator 450 is run, and a current is produced by the generator 450. The semiconductor light emitting diode(s) 430 is then turned on, and the sterilization item A is sterilized.

If the drawer 475 is available in the container 470, only the drawer 475 can be taken out without the container 470, and the sterilization item A in the drawer 475 is then stored or used.

FIG. 16 illustrates an exemplary assembly process of a sterilization apparatus according to the present disclosure.

Figure 16A:
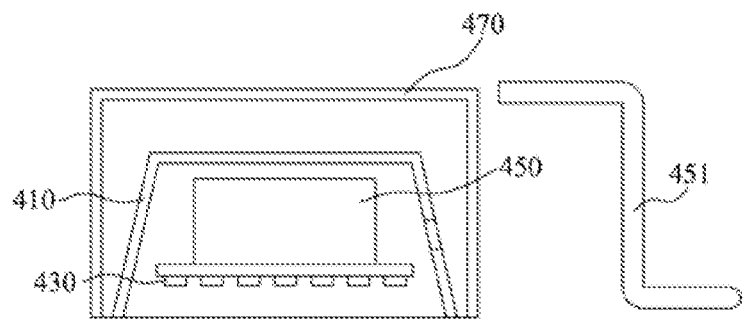
FIGS. 16a and 16b illustrate an exemplary assembly process of a sterilization apparatus according to the present disclosure.

Referring to FIG. 16(a), the case 410 and the container 470 can be put together first by overlaying them, without the handle 451 being attached.

Figure 16B:
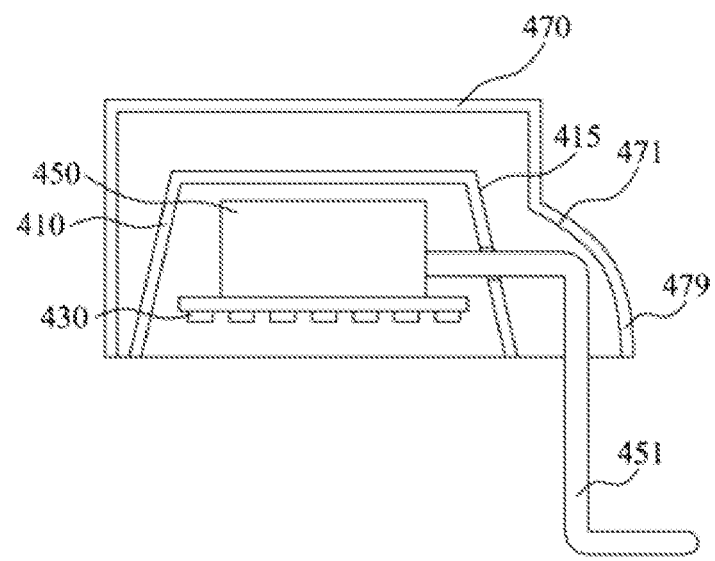

Alternatively, referring to FIG. 16(b), the case 410 and the container 470 can be put together, with the handle 451 being attached. The container 470 can have a spout 479 as an entry for the handle 451.

The case 410 is first placed, and the container 470 is overlaid, covering the case 410. That is, the outer face 419 of the case 410 and the inner face 471 of the container 470 are disposed to face each other.

When the sterilization apparatus 400 is transported to a different location, the case 410 and the container 470 can be moved together in overlaid state, so that the sterilization apparatus 400 can have a reduced volume while being transported.

The case 410 is preferably formed at a lower height than the container 470 as the case 410 has to fit inside the container 470.

Figure 17:
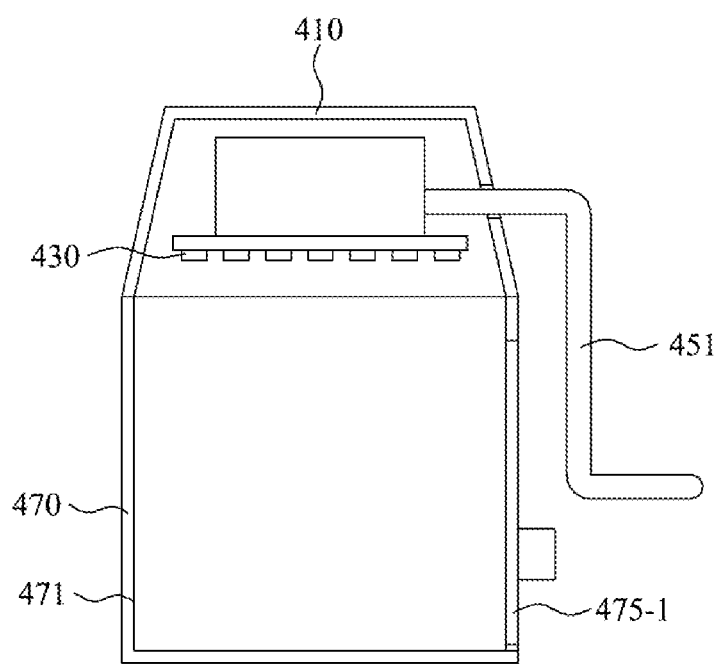
FIG. 17 shows another exemplary embodiment of a sterilization apparatus according to the present disclosure.

FIG. 17 shows another exemplary embodiment of a sterilization apparatus according to the present disclosure.

A door 475-1 is provided on a lateral face 478 of the container 470. The door 475-1 is designed to be open/closed. The sterilization item A (see FIG. 15) is put in the container 470 by opening the door 475-1. With the presence of the door 475-1, it becomes possible to sterilize the item A without contaminating the inner face 471 of the container 470.

The door 475-1 has to be closed to enable a sterilization process on the sterilization item A. If the door 475-1 is not closed, the semiconductor light emitting diode(s) 430 will not turn on even when the generator 450 is running. For instance, a magnet switch or a contact switch may be installed between the door 475-1 and the container 470. Since the container 470 is washed with water very often, the magnet switch can be placed at the case 410 or door 475-1 to protect the magnet switch from water contact.

Because the eyes of a user can be exposed directly to ultraviolet light if the semiconductor light emitting diode(s) 430 operates while the door 475-1 is open, it is important to close the door 475-1 so that no ultraviolet light escapes to the outside of the container 470. This principle can be equally applied to the drawer 475 in FIG. 10.

In addition, if the sterilization item is water filled in a cup and placed inside by opening the door 475-1, not only the water but the cup (possibly contaminated as well) can also be sterilized at the same time.

FIG. 18 shows another exemplary embodiment of a sterilization apparatus 500 according to the present disclosure.

Figure 18A:
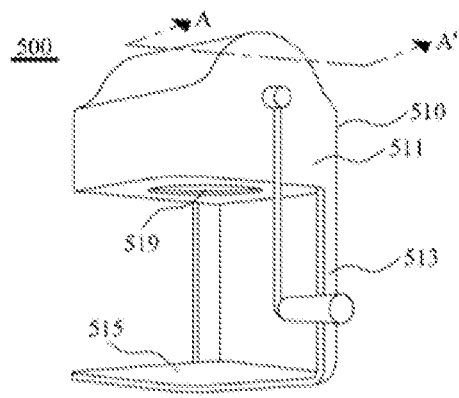
FIGS. 18a, 18b and 18c show another exemplary embodiment of a sterilization apparatus according to the present disclosure.
Figure 18B:
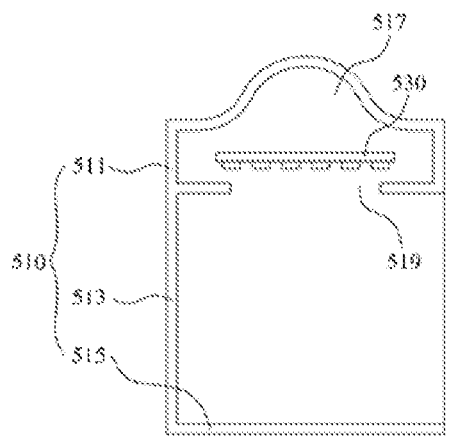
Figure 18C:
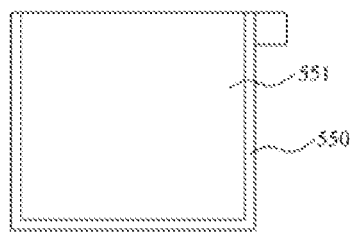

FIG. 18(a) shows an example of the sterilization apparatus 500, FIG. 18(b) is a cross sectional view taken along AA', and FIG. 18(c) illustrates one example of a container 500 that can be used in the sterilization apparatus 500.

The sterilization apparatus 500 includes a case 510 and semiconductor light emitting diode(s) 530.

The semiconductor light emitting diode(s) 530 emits ultraviolet light.

The case 510 includes an upper section 511 having an internal space 517 and an entrance opening 519; a bottom face 515 opposite to the entrance opening 519; and a lateral face 513 connecting the upper section 511 and the bottom face 515.

The semiconductor light emitting diode(s) 530 is arranged in the internal space 517 to face towards the entrance opening 519. Ultraviolet light emitted from the semiconductor light emitting diode(s) 530 is directed towards the bottom face 515, going through the entrance opening 519.

The ultraviolet light emitted from the semiconductor light emitting diode(s) 530 is harmful to human eyes. If a person gazes directly at the ultraviolet light, a painful eye condition is caused by such an exposure to the ultraviolet light. Therefore, it is desirable that the ultraviolet light emitted from the semiconductor light emitting diode(s) 530 should be absorbed by the bottom face 515 and by the lateral face 513. To do so, the bottom face 515 and the lateral face 513 can be made of UV absorbing materials.

By making ultraviolet light coming out of the upper section 511 of the case 510 of the sterilization apparatus 500 being absorbed by the bottom and lateral faces 515 and 513, instead of being reflected therefrom, the eyes of a user who manipulated the case 510 can be protected from the ultraviolet light. In addition, even if the sterilization apparatus 500 might fall over while still in running, since ultraviolet light is absorbed by the bottom and lateral faces 515 and 513, the eyes of the user can be well protected.

In particular, considering that ultraviolet light travels through a medium in a straight line, there is a possibility that if the case 510 falls down or flips over, the ultraviolet light coming out of the entrance opening 519 might be directed straight into the eyes of the user. Fortunately however, since the bottom face 515 is arranged opposite to the entrance opening 519, the ultraviolet light is absorbed by the bottom face 515, and the user can be protected from eye injuries.

Referring to FIG. 18(*c*), the container 550 is arranged between the upper section 511 and the bottom face 515, and has an internal space 551. The container 550 can be light-transmitting. Also, the container 550 can be made of such a material that ultraviolet light emitted from the semiconductor light emitting diode(s) 530 does not escape to the outside of the container.

Figure 19:
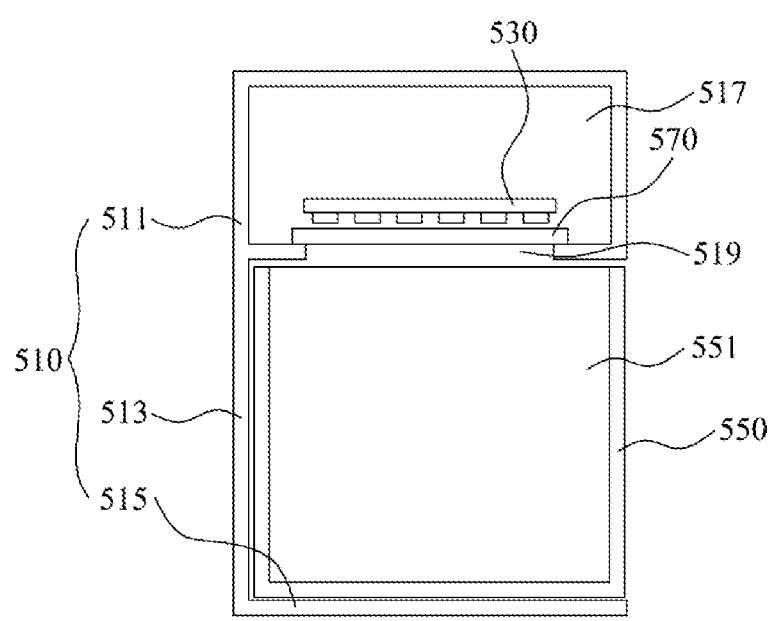
FIG. 19 shows another exemplary embodiment of a sterilization apparatus according to the present disclosure.

FIG. 19 shows another exemplary embodiment of a sterilization apparatus according to the present disclosure.

The container 550 is arranged between the upper section 511 and the bottom face 515 of the case 510. Ultraviolet light enters the internal space 551 of the container 550 and sterilizes the same. Therefore, any item or water to be sterilized can be placed in this internal space 551 of the container 550. The container 550 is detachable between the upper section 511 and the bottom face 515.

There can be a plate 570 at the entrance opening 519 of the internal space 517 in the upper section 511 of the case 510. Ultraviolet light is emitted through this plate 570. Therefore, the plate 570 should be made of a material that can transmit ultraviolet light therethrough.

Figure 20:
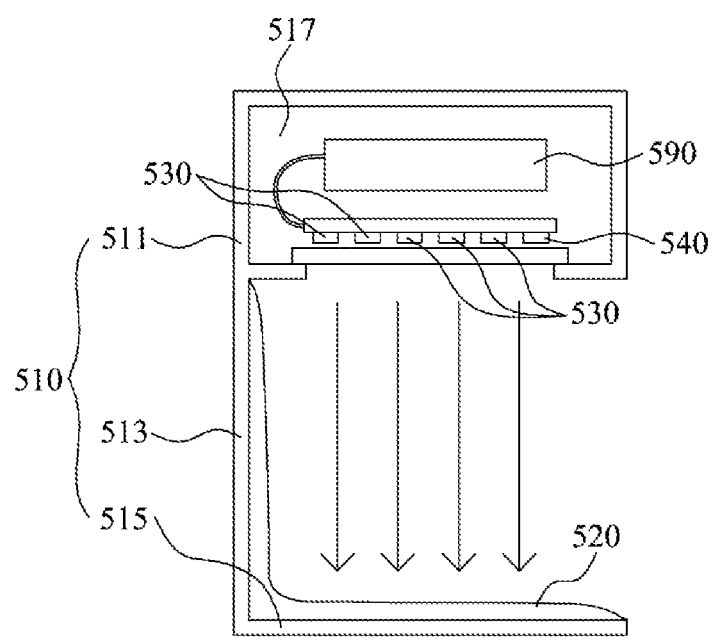
FIG. 20 shows another exemplary embodiment of a sterilization apparatus according to the present disclosure.
Figure 21:
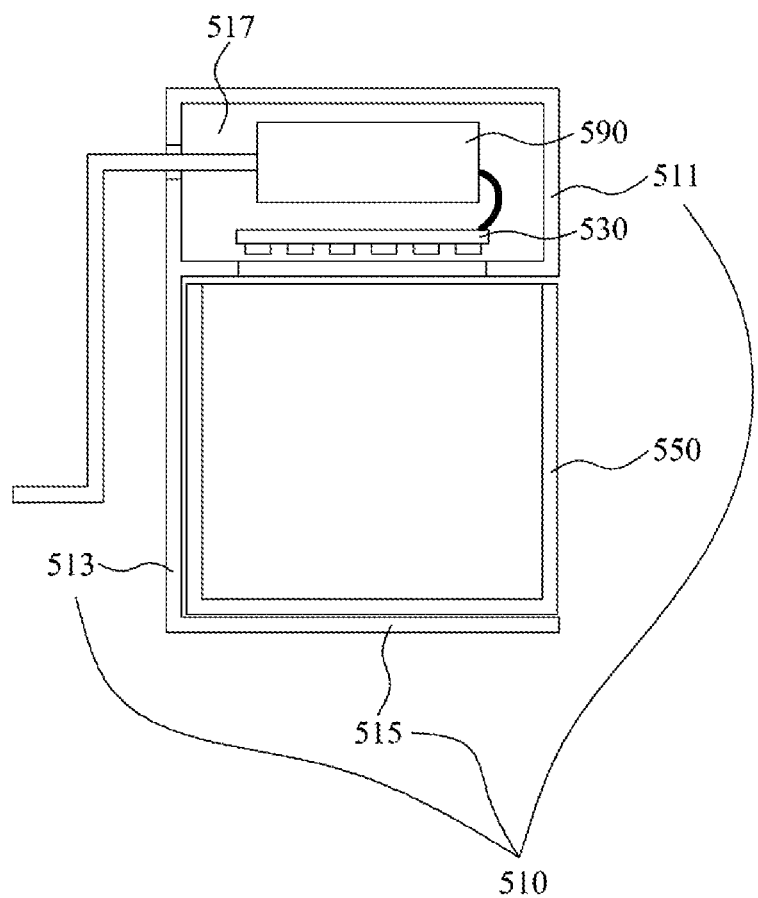
FIG. 21 shows another exemplary embodiment of a sterilization apparatus according to the present disclosure.

A power supply unit 590 (not shown) can be provided either in the internal space 517 of the case 510 or outside. FIG. 20 and FIG. 21 illustrate examples where the power supply unit is provided in the internal space 517. Although an example where the power supply unit is located outside is not shown, a power cord, a battery, or a generator can be arranged outside as the power supply unit.

FIG. 20 shows another exemplary embodiment of a sterilization apparatus according to the present disclosure.

The power supply unit 590 is provided in the internal space 517 of the upper section 511 of the case 510, and electrically connected to the semiconductor light emitting diode(s) 530. The power supply unit 590 can be a battery.

When the power supply unit 590 is a battery, the semiconductor light emitting diode(s) 530 can be turned on before the container 550 (see FIG. 19) is placed. In this case, eyes of the user can be exposed to the ultraviolet light emitted from the semiconductor light emitting diode(s) 530, and possibly get injured.

For this reason, a UV-absorbing layer 520 can be further provided onto at least one of the bottom and lateral faces 515 and 513. With the presence of the UV-absorbing layer 520, most of the ultraviolet light is absorbed by the layer 520, and only a very small amount of the ultraviolet light can escape to the outside of the sterilization apparatus 500. The presence of the UV-absorbing layer 520 is useful in case that the bottom face 515 and the lateral face 513 are made of UV-reflecting materials because the UV-absorbing layer 520 prevents the reflection of ultraviolet light and absorbs ultraviolet light escaping through areas other than the bottom face 515.

The semiconductor light emitting diode(s) 530 emits ultraviolet light when it is turned on, but the ultraviolet light is not visible to the naked eye. Therefore, it is difficult to find out whether the semiconductor light emitting diode(s) 530 is receiving power. For the user, an alarm unit 540 that emits visible light can be provided, along with the semiconductor light emitting diode(s) 530. The alarm unit 540 may be a UV LED (light emitting diode), or a UV-VIS LED capable of emitting ultraviolet light and visible light at the same time.

FIG. 21 shows another exemplary embodiment of a sterilization apparatus according to the present disclosure.

The power supply unit 590 is provided in the internal space 517 of the upper section 511 of the case 510, and electrically connected to the semiconductor light emitting diode(s) 530. The power supply unit 590 can be a generator. In that case, a handle for operating the generator is included in the case 510. Details on the generator can be found in FIG. 11.

Figure 22:
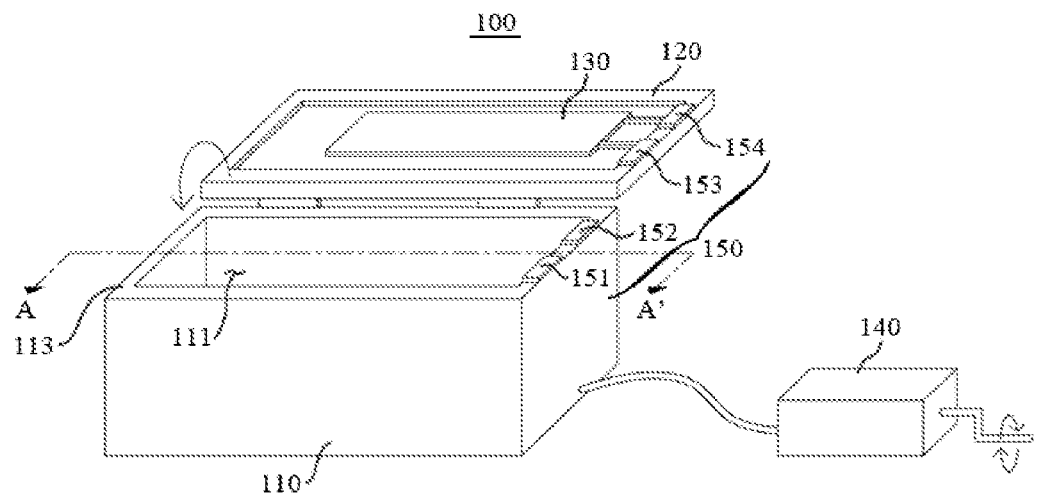
FIG. 22 shows an exemplary embodiment of a water sterilization apparatus according to the present disclosure.

FIG. 22 shows an exemplary embodiment of a water sterilization apparatus 100 according to the present disclosure.

The water sterilization apparatus 100 includes a body 110, a cover 120, and a light source 130, in which the body 110 has an internal space 111 defined therein. The cover 120 is arranged on top of the body 110 to cover the internal space 111, and the light source 130 is located at the cover 120. As aforementioned, since the light source 130 is located at the cover 120, which is arranged on top of the body 110, water cannot reach the light source 130. Hence, the light source 130 does not need to be water-proof or water-resistant.

Figure 1:
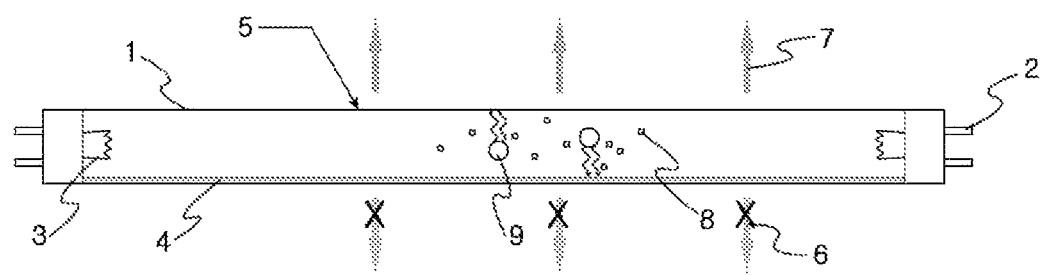
FIG. 1 shows a structural example of an ultraviolet (UV) lamp described in Korean Unexamined Utility Model Publication No. 20-2015-0002677.
Figure 2:
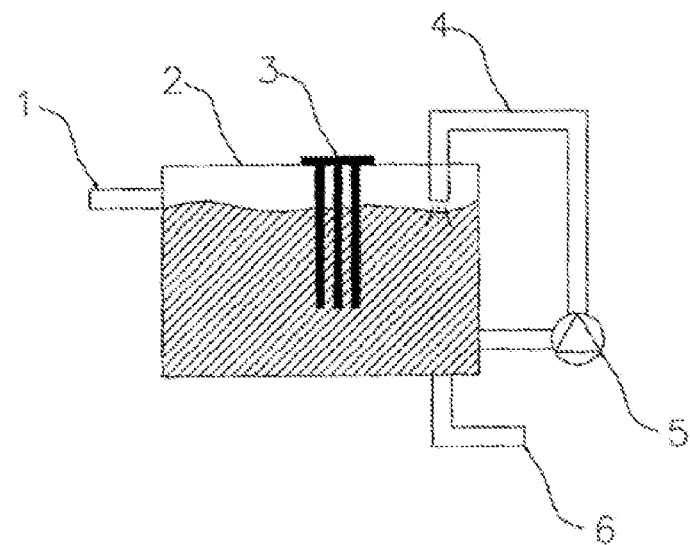
FIG. 2 shows an example of a UV sterilization system described in Korean Unexamined Patent Publication No. 10-2005-0115348.
Figure 3:
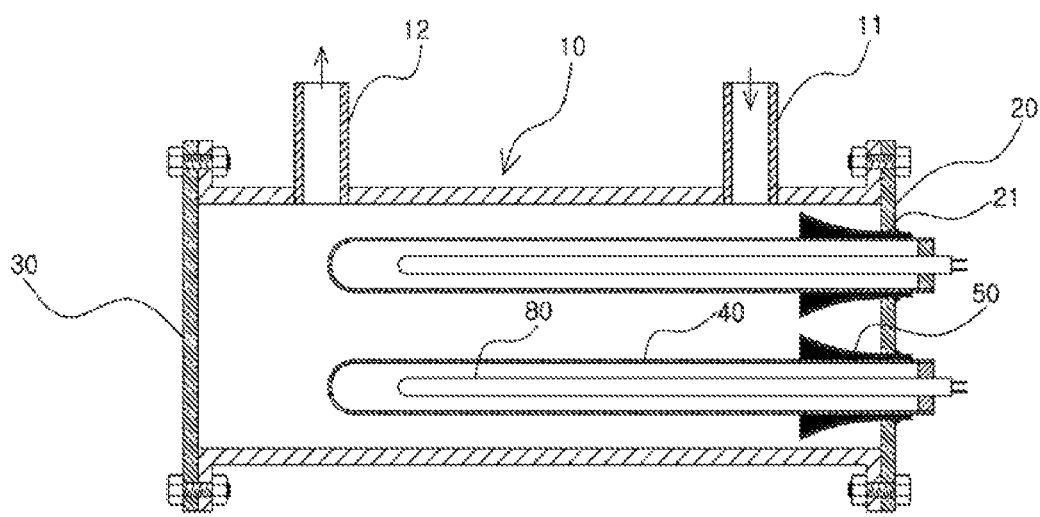
FIG. 3 shows an example of a UV water sterilizer described in Korean Unexamined Patent Publication No. 10-2014-0028513.

In one example, the cover 120 can be designed to be detachable or separable from the body 110 (not shown), or can be connected to the one side of the body 110 as shown in FIG. 3. In this example, the light source 130 can be arranged at the bottom face of the cover 120.

The light source 130 includes at least one semiconductor light emitting diode 131 (see FIG. 25) that can emit ultraviolet light. The light source 130 emits ultraviolet light towards the internal space 111 of the body 110. The light source 130 emits light having a wavelength between 200 and 400 μm. For example, the semiconductor light emitting diode can be formed of an AlGaN-based substance, and covers an ultraviolet region where AlGaN can be emitted. Preferably, it is effective if the light source 130 emits ultraviolet light of between 240 and 300 nm because DNA and RNA carrying the genetic information show a strong absorption at near 260 nm, meaning that ultraviolet light in that region destroys DNA and RNA sequences. AlGaN-based semiconductor light emitting diodes are capable of generating light in such an ultraviolet region. Having a wavelength of 300 nm or greater does not necessarily mean that the ultraviolet light is not useful for sterilization, but it means that a relatively longer exposure time is required. Viruses, bacteria, or parasites are single celled or not multi-celled organisms such that they can easily be killed or sterilized in that ultraviolet region. On the other hand, if the ultraviolet light has a wavelength of 400 nm or greater, its sterilization performance is significantly poor and sterilization effect is very limited.

The sterilization apparatus of the invention is primarily intended to be used in remote places without an access to electricity. When used in those places, the sterilization apparatus of the invention is designed to work with a manually driven electric generator. However, if manual labor time for running the generator takes long, not many will use the generator as it is not practically convenient and useful. Therefore, ultraviolet light having a wavelength preferably between 240 and 300 nm is desired in order to get rid of viruses, bacteria or parasites present inside water as quickly as possible within a short period of time. Keeping the wavelength range is also important because it gets more difficult to manufacture a semiconductor light emitting diode, which is very efficient and produces light with a shorter wavelength.

The body 110 is desirably made of a material that does not transmit ultraviolet light emitted from the semiconductor light emitting diode. Yet, it is more desirable to make the body 110 with a material that blocks ultraviolet light but transmits visible light therethrough. For instance, the body 110 is desirably made of a corrosion-resistant metal such as stainless or aluminum. Still, it is more desirable to make the body 110 with glass or transparent plastics such that the body 110 may block ultraviolet light from the semiconductor light emitting diode but transmit only visible light therethrough. For information, it is known that ultraviolet light with a shorter wavelength cannot transmit through a non-crystalline or amorphous object such as glass in general. A VIS-transmitting material is preferred for the body 110 because a user can check from the outside of the body 110 whether or not the light source 130 is being operated by looking at the visible light transmitted through the body 110.

The internal space 111 of the body 110 is filled with water, and the water is then sterilized by ultraviolet light from the light source 130.

The water sterilization apparatus 100 can be supplied with power by a generator 140. Here, the generator 140 may be a manually driven generator. The manually driven generator is a human powered generator.

The generator 140 is arranged at a distance from the body 110, and power produced by the generator 140 is delivered to a first contact 151, a second contact 152, a third contact 153, a fourth contact 154, and the light source 130.

Figure 27:
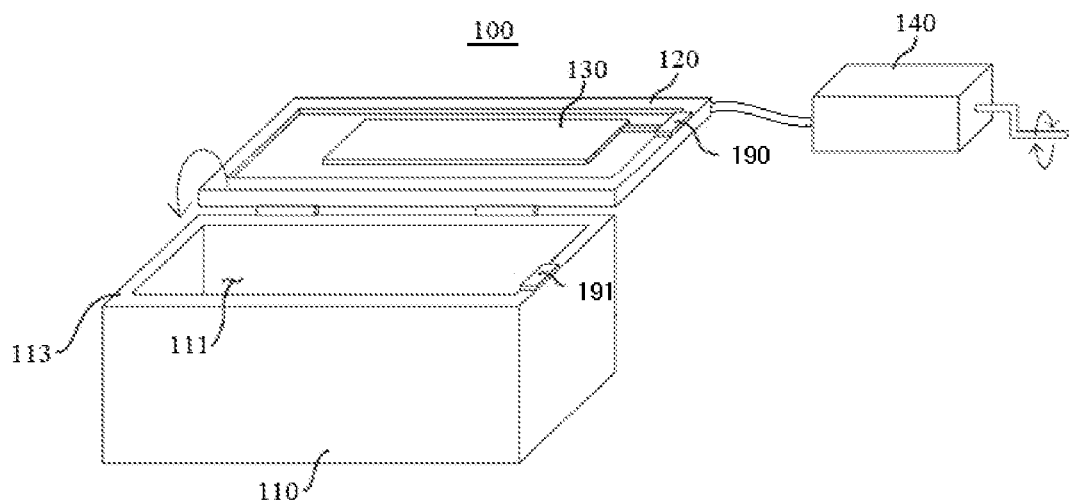
FIG. 27 shows another exemplary embodiment of a water sterilization apparatus according to the present disclosure.

The first contact 151 and the second contact 152 are located at the body 110, while the third contact 153 and the fourth contact 154 are located at the cover 120. When the internal space 111 of the body 110 is closed with the cover 120, the first contact 151 of the body 110 is closely connected with the third contact 153 of the cover 120, and the second contact 152 of the body 110 is closely connected with the fourth contact 154 of the cover 120, forming a circuit for a current to flow therein. The light source 130 is electrically connected to the third contact 153 and fourth contact 154 of the cover 120. In the circuit, when the first contact 151 and the third contact 153 in separate states meet together and are closely connected to each other, and when the second contact 152 and the fourth contact 154 in separate states meet together and are closely connected to each other, they each are acting as a switch. That is, having them act as a switch is similar to having switches in the front and back of the light source 130. The first to fourth contacts 151-154 are provided to ensure that the light source 130 is supplied with power only when the cover 120 is closed because ultraviolet light with a shorter wavelength can bring eye and skin injuries to a user. Electrical connection can be done in any other ways as far as the need is met. One of those examples is illustrated in FIG. 27.

Arranging the first/third contacts and the second/fourth contacts at the body 110 and the cover 120, respectively, of a positive and a negative electrode is intended to make it easier to detach the cover 120 from the body 110, and to wash the body 110 filled with water. While FIG. 22 shows that the cover 120 is connected to the body 110, a joint part between the cover 120 and the body 110 can be eliminated as a circuit is still formed and functions well when the first to fourth contacts 151-154 are connected after the cover 120 is simply closed over the body 110.

Alternatively, it is also possible to connect the body 110 and the cover 120 through a wire at one side, and to make a contact (as a contact switch) where the body 110 and the cover 120 meet at the other side. In this case, however, the cover 120 and the body 110 have to be connected to each other all the time, which makes it inconvenient to wash the body 110 separately.

Electricity produced from the generator 140 is supplied to the light source 130 at the cover 120 via the body 110. A wobble that might possibly be created during the manual operation of the generator 140 does not affect the body 110 as the body 110 is arranged at a distance from the generator 140.

Moreover, as aforementioned, the light source 130 is supplied with power and emits light only after the cover 120 is closed over the body 110. Thus, the risk of electrical accidents such as a shock can be reduced, and direct exposure of eyes and skin to ultraviolet light can be avoided.

Figure 23:
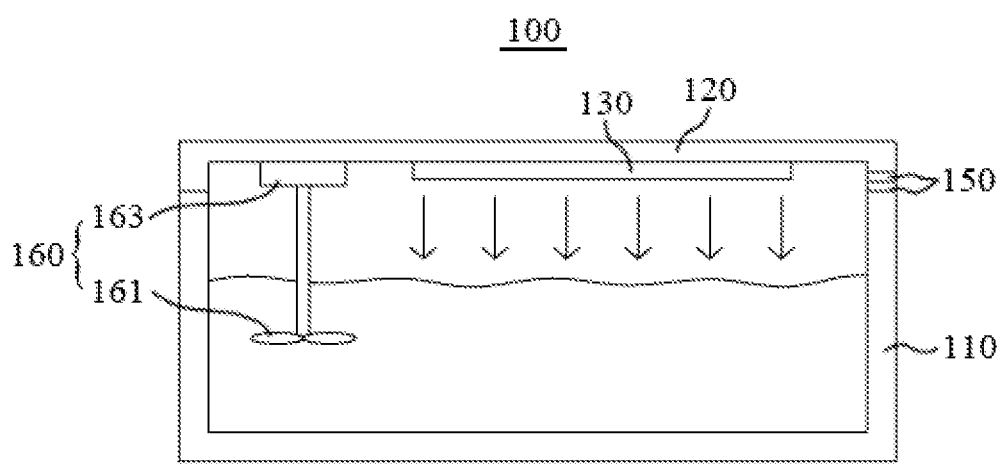
FIG. 23 shows another exemplary embodiment of a water sterilization apparatus according to the present disclosure.

FIG. 23 shows another exemplary embodiment of a water sterilization apparatus 100 according to the present disclosure.

FIG. 23 is a cross sectional view taken along AA' of FIG. 22. Because the light source 130 is located at the cover 120 and radiates ultraviolet light onto the upper part of the water in the body, other remote parts of the water far from the light source 130 may not be sterilized effectively. To this end, the water sterilization apparatus 100 can further include a circulator 160 for circulating the water. The circulator 160 is attached to the cover 120. In particular, an electrical-conducting part of the circulator 160 is placed at the cover 120 and does not get into the water such that the electrical-conducting part does not need to be water-proofing.

The circulator 160 includes a rotor 161 and a motor 163. The motor 163 is kept at the cover where the water cannot reach, while the rotor 161 is put in the water. In an alternative not shown, the circulator 160 may include a manually driven circulator.

Figure 24:
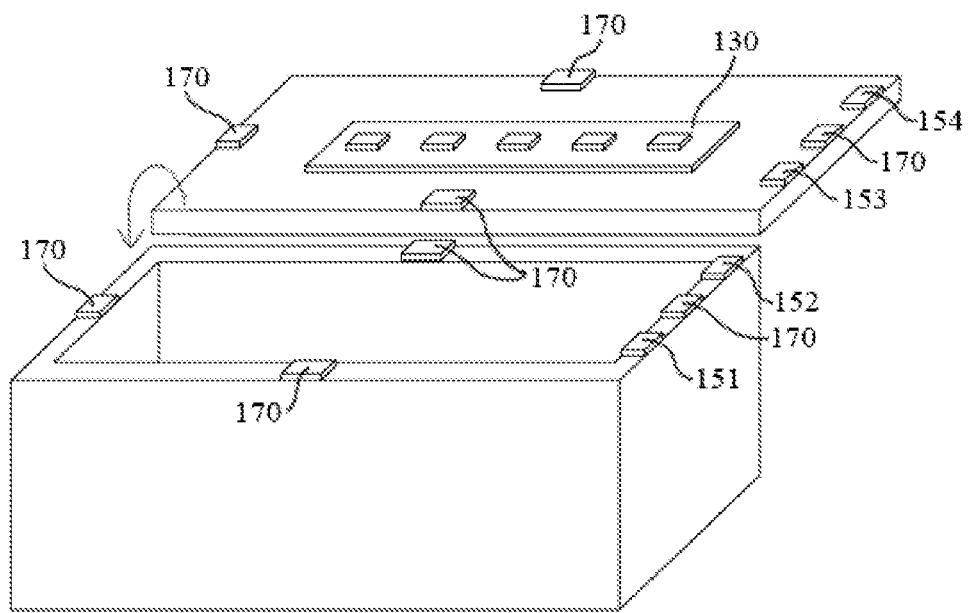
FIG. 24 shows another exemplary embodiment of a water sterilization apparatus according to the present disclosure.

FIG. 24 shows another exemplary embodiment of a water sterilization apparatus according to the present disclosure.

The first and second contacts 151 and 152 of the body 110 (see FIG. 23) can have a stable electrical connection with the third and fourth contacts 153 and 154 of the cover 120 (see FIG. 23) with the help of a connector 170 which is provided to fix the cover 120 and the body 110 while they are being separated from each other as shown in FIG. 24. The connector 170 can be a magnet, for example. The connector 170 may include two cooperating elements arranged at direct opposite locations when the cover 120 is closed over the body 110.

Figure 25:
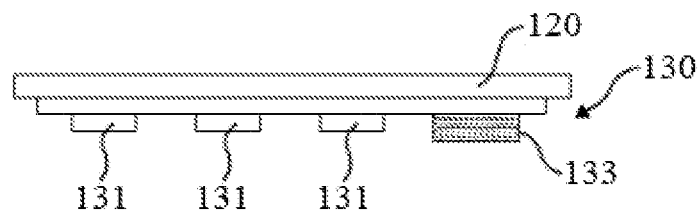
FIG. 25 shows another exemplary embodiment of a water sterilization apparatus according to the present disclosure.

FIG. 25 shows another exemplary embodiment of a water sterilization apparatus according to the present disclosure.

Figure 26:
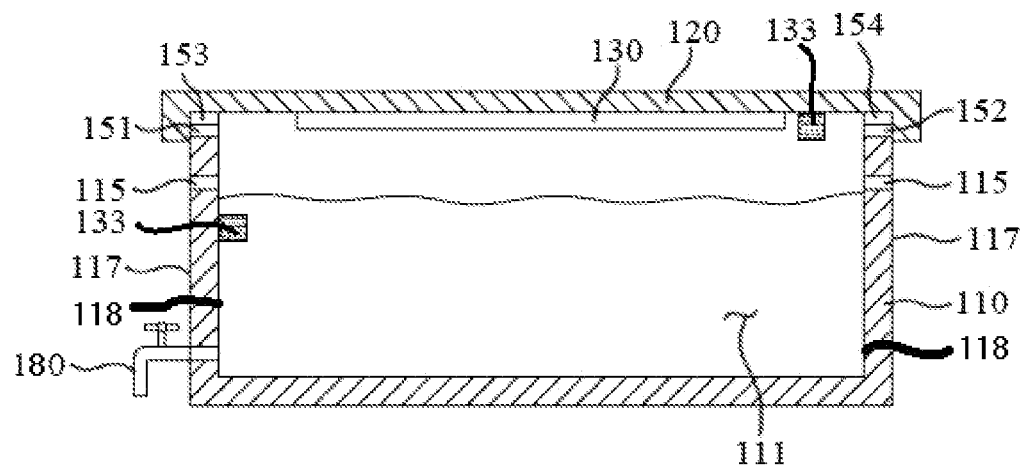
FIG. 26 shows another exemplary embodiment of a water sterilization apparatus according to the present disclosure.

The light source 130 includes a plurality of semiconductor light emitting diodes 131, and a wavelength conversion material 133 capable of changing ultraviolet light emitted from the semiconductor light emitting diodes 131 into visible light. The wavelength conversion material 133 can be provided onto at least one of the following: the light source 130, the cover 120 and the inner lateral face 118 (see FIG. 26) of the body 110. An example of the wavelength conversion material 133 provided onto the light source 130 is illustrated in FIG. 25; another example of the wavelength conversion materials 133 provided onto the cover 120 and the inner lateral face 118 of the body 110 is illustrated in FIG. 26. Although not shown, the wavelength conversion material 133 may cover one of the semiconductor light emitting diodes 131. It should be noted that, however, uncovered semiconductor light emitting diodes 131 have a higher efficiency than covered semiconductor light emitting diodes 131. Moreover, the wavelength conversion material 133 provided onto the inner lateral face 118 can be enclosed by a light-transmitting transparent encapsulating material (not shown) such that the wavelength conversion material 133 can be protected and will not be reached directly by water.

The wavelength conversion material 133 changes ultraviolet light into visible light. The resulting visible light is seen from the outside of the body 110 (see FIG. 23). Since the ultraviolet light appears colorless, it is changed into visible light by the wavelength conversion material 133. As a result, the user can check, by looking at, whether the UV-emitting light source 130 is being properly operated inside the water sterilization apparatus.

FIG. 26 shows another exemplary embodiment of a water sterilization apparatus according to the present disclosure.

A drain hole 115 for water can be formed at a height lower than the first and second contacts 151 and 152 located at the upper section 113 of the body 110. As such, even if water overflows, the first and second contacts 151 and 152 will not be shorted. In this embodiment, the first to fourth contacts 151-154 are not located at any one of the lateral faces of the body 110 and cover 120, but they are located at those opposite lateral faces of the body 110 and cover 120.

In addition, the body 110 can include a faucet 180 connected to the internal space 111. With the faucet 180, it is easy to take the sterilized water out of the body 110.

The cover 120 can be designed to partly cover outer lateral faces 117 of the body 110. This can prevent ultraviolet light from escaping between the body 110 and the cover 120, and immobilize the cover 120 from the body 110. In this manner, the first and second contacts 151 and 152 can have a better contact with the third and fourth contacts 153 and 154, respectively.

FIG. 27 shows another exemplary embodiment of a water sterilization apparatus according to the present disclosure.

While the magnet in FIG. 24 was used to secure the positions of the body 110 and cover 120, a magnetic unit 191 in FIG. 27 uses a magnetic field to operate a switch 190 and further to close the circuit when the body 110 is closed with the cover 120. Preferably, the switch 190 is operated by the magnetic unit 191, and an example of the switch 190 is a reed switch.

The magnetic unit 191 can be arranged on the body 110. A preferable example of the magnetic unit 191 is a magnet. As the cover 120 is closed over the body 110 having the magnetic unit 191, a space is created therebetween, and influenced by the magnetic field of the magnetic unit 191. This space is where the switch 190 is arranged. The cover 120 has the light source 130 which is connected to the generator 140. Therefore, the light source 130 cannot emit limit until the body 110 is closed by the cover 120 and power is supplied from the generator to the light source 130.

It is preferable that the generator 140 that supplies power to the light source 130 is directly connected to the cover 120. This is because a wire has to be connected to allow electricity to flow between the body 110 and the cover 120, but it is not easy to clean the internal space of the body 110 with the wire being connected thereto.

Figure 28A:
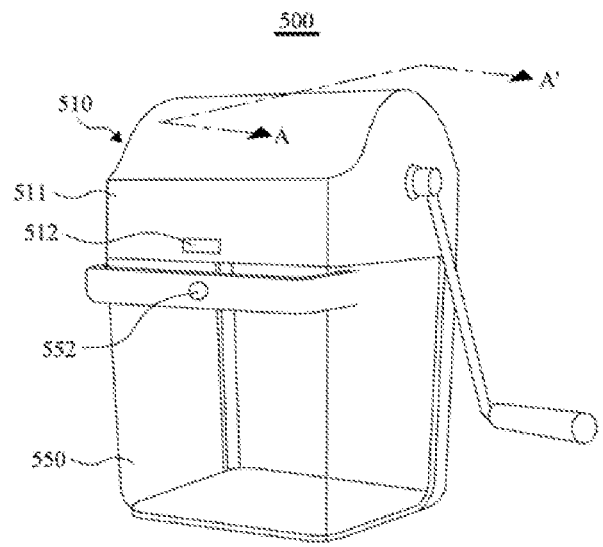
FIGS. 28a and 28b show another exemplary embodiment of a sterilization apparatus according to the present disclosure.
Figure 28B:
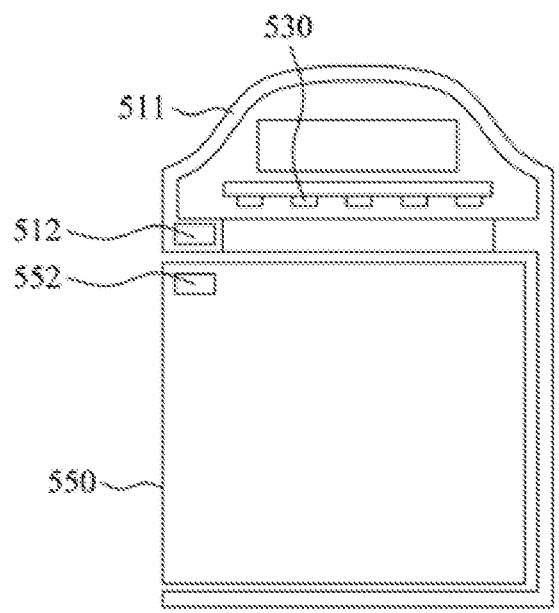

FIG. 28 shows another exemplary embodiment of a sterilization apparatus 500 according to the present disclosure.

FIG. 28(*a*) is a perspective view of the sterilization apparatus 500, and FIG. 28(*b*) is a cross sectional view of the sterilization apparatus 500, taken along AA'.

The sterilization apparatus 500 includes a sensor 512 arranged in a case 510, and a magnet 552 arranged in a container 550. The sensor 512 can be a reed switch. The sensor 512 can be turned on/off by the magnet 552. If the magnet 552 and the sensor 512 are sufficiently near each other, a circuit is connected/disconnected when the sensor 512 is turned on/off. In other words, the sensor 512 functions as a switch.

In particular, the sensor 512 can be arranged in an upper section 511 of the case 510, and the magnet 552 can be arranged in an area of the container 550 abutting onto the upper section 511 of the case 510. Preferably, the sensor 512 is not turned on until the container 550 is joined with the case 510, and semiconductor UV light emitting diode(s) 512 is then operated once the sensor 512 is turned on. The semiconductor light emitting diode(s) 530 emits ultraviolet light which can be harmful to the human body. Because of that, the semiconductor light emitting diode(s) 530 should not operate until the container 550 is completely joined with the case 510. Again, this is because the ultraviolet light coming out of the semiconductor light emitting diode(s) 530 can cause injuries to the human body. Therefore, it is preferable that the container 550 is completely joined with the case 510 first, and the sensor 512 is then turned on only after it is ensured that no ultraviolet light is allowed to escape to the outside of the container 510.

The sterilization apparatus 500 described in FIG. 28 is substantially identical with the sterilization apparatus 500 described in FIG. 18, except the features described above.

Figure 29A:
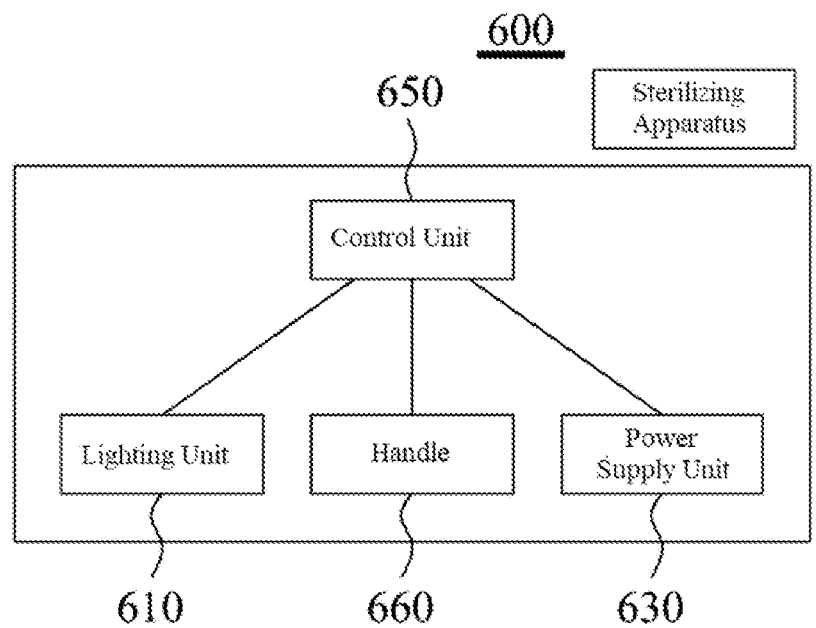
FIGS. 29a and 29b show another exemplary embodiment of a sterilization apparatus according to the present disclosure.
Figure 29B:
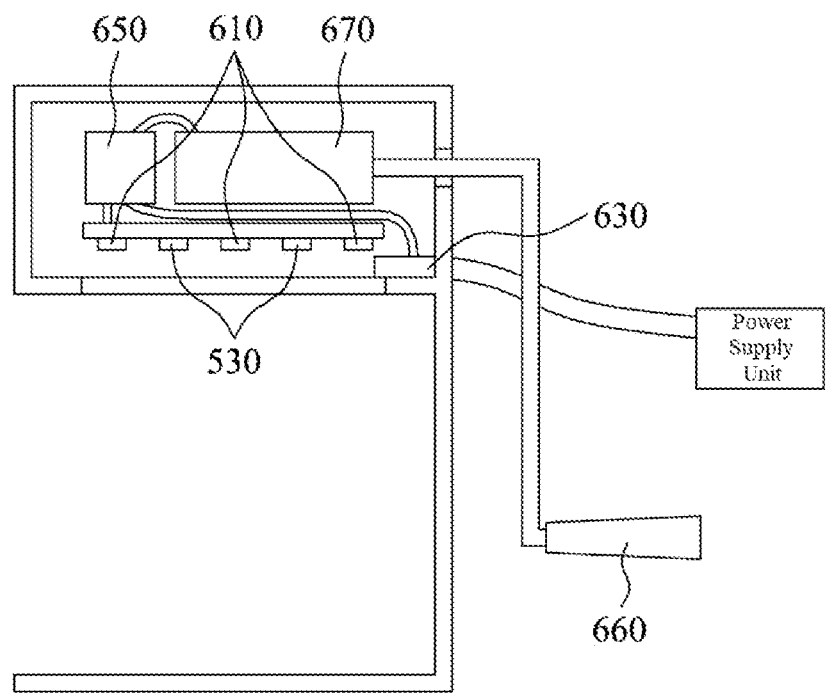

FIG. 29 shows another exemplary embodiment of a sterilization apparatus 600 according to the present disclosure.

The sterilization apparatus 600 can further include a lighting unit 610, a power supply unit 630, and a control unit 650. The lighting unit 610 includes a semiconductor VIS light emitting diode, for example. The power supply unit 630 supplies power to the sterilization apparatus 600. The control unit 650 detects whether the power supply unit 630 is connected, whether a handle 660 is being rotated, and whether the lighting unit 610 is turned on. The handle 660 can be connected to the generator 670. Details on the generator 670 can be found in FIG. 11.

When the power supply unit 630 is powered by an external power source, it supplies power to the sterilization apparatus 600. Then the control unit 650 detects connection with the power supply unit 630. Also, the control unit 650 detects rotation of the handle 660. A current is produced by the rotation of the handle 660. Therefore, when the handle 660 is rotated, the lighting unit 610 is turned on. When the lighting unit 610 is turned on, the semiconductor VIS light emitting diode of the lighting unit 610 starts operating.

On the other hand, when the handle 660 is rotated while the lighting unit 610 is being turned on, the lighting unit 610 is turned off. When the handle 660 is rotated while the semiconductor VIS light emitting diode is being operated, the semiconductor VIS light emitting diode goes off.

For instance, when the handle 660 is rotated, the generator 370 starts running and produces electricity. This can be detected by the control unit 650.

The sterilization apparatus 600 described in FIG. 29 is substantially identical with the sterilization apparatus 500 described in FIG. 18, except the features described above.

Hereinafter, various embodiments of the present disclosure will be described.

(1) A sterilization apparatus comprising: a semiconductor UV (ultraviolet) light emitting diode; and a case including an upper section with an internal space and an entrance opening, a bottom face opposite to the entrance opening, and a lateral face connecting the bottom face and the upper section, wherein the semiconductor light emitting diode is arranged in the internal space.

(2) The sterilization apparatus, wherein the bottom face is made of a material that does not transmit ultraviolet light.

(3) The sterilization apparatus, further comprising: a container arranged between the entrance opening and bottom face of the case, and adapted to receive ultraviolet light therein.

(4) The sterilization apparatus, wherein the container is detachable between the upper section and bottom face of the case.

(5) The sterilization apparatus, wherein the bottom face is provided with a UV-absorbing layer.

(6) The sterilization apparatus, wherein the lateral face is configured not to transmit ultraviolet light therethrough.

(7) The sterilization apparatus, wherein the lateral face is provided with a UV-absorbing layer.

(8) The sterilization apparatus, wherein the internal space of the case is provided with a generator.

(9) The sterilization apparatus, wherein the internal space of the case is provided with a battery.

(10) The sterilization apparatus, wherein the entrance opening is provided with a UV-transmitting plate.

A sterilization apparatus according to one embodiment of the present disclosure is configured to protect user from UV by means of the lateral face and/or the upper face.

(11) A sterilization apparatus comprising: a case; a semiconductor UV light emitting diode arranged in the case; a generator arranged in the case and adapted to supply electricity to the semiconductor light emitting diode; and a container joined with the case, the container having an inner face and a height measured from the bottom, wherein the semiconductor light emitting diode emits ultraviolet light towards the inner face of the container, and wherein the ultraviolet light is prevented from escaping to the outside of the container.

When a user utilizes the sterilization apparatus, UV light is prohibited to the outside.

(12) The sterilization apparatus, wherein the case has a height lower than a height of the container.

(13) The sterilization apparatus, wherein the generator includes a handle having a length falling between the bottom face of the case and the bottom face of the container.

(14) The sterilization apparatus, wherein the container includes a drawer.

(15) The sterilization apparatus, wherein the case fits inside the drawer.

(16) The sterilization apparatus, wherein the container includes a door on a lateral face of the container.

(17) The sterilization apparatus, wherein the container includes a spout.

(18) The sterilization apparatus, wherein the case includes an alarm unit for emitting visible light.

(19) The sterilization apparatus, wherein the case is arranged over the container, with the case and the container being fixed.

(20) The sterilization apparatus, wherein the case is in a flipped over state before entering the container.

A sterilization apparatus according to one embodiment of the present disclosure is configured to put the case inside the container, making it small and easy to carry around.

A sterilization apparatus according to another embodiment of the present disclosure can perform sterilization in a very simple manner.

A sterilization apparatus according to another embodiment of the present disclosure can perform sterilization with no further need for an external power source.

(21) A sterilization apparatus comprising: a case having an entrance opening facing downward, the case defining a first internal space; a semiconductor UV light emitting diode arranged in the first internal space of the case, for emitting ultraviolet light towards the entrance opening of the case; and a generator including a handle for supplying electricity to the semiconductor light emitting diode.

(22) The sterilization apparatus, further comprising: a window arranged under the semiconductor light emitting diode, and adapted to transmit light from the semiconductor light emitting diode therethrough and to protect the first internal space.

(23) The sterilization apparatus, wherein the case has a top face, and wherein the generator is arranged on the top face of the case.

(24) The sterilization apparatus, further comprising: a barrier protruded from the case.

(25) The sterilization apparatus, wherein the case has a top face, wherein the generator is arranged on the top face of the case, and wherein the sterilization apparatus further comprises: a window arranged under the semiconductor light emitting diode, and adapted to transmit light from the semiconductor light emitting diode therethrough and to protect the first internal space; and a barrier protruded from the case.

A sterilization apparatus according to another embodiment of the present disclosure is configured such that the force applied to the handle is transferred to the case for running the generator, and the first internal space is sealed to offer an improved sterilization performance in the first internal space.

A sterilization apparatus according to another embodiment of the present disclosure is portable and self-powered such that sterilization can be performed in a very simple manner.

A sterilization apparatus according to another embodiment of the present disclosure uses ultraviolet light for a convenient sterilization process, and is very safe for users.

(26) A water sterilization apparatus comprising: a body having an internal space to be filled with water; a cover adapted to cover the internal space; and a light source arranged in the cover, the light source emitting ultraviolet light and receiving power after the cover is closed over the body.

(27) The water sterilization apparatus, wherein the body has a first contact and a second contact, and wherein the cover has a third contact and a fourth contact.

(28) The water sterilization apparatus, wherein the light source includes light with a wavelength between 200 and 400 nm.

(29) The water sterilization apparatus, further comprising: a circulator for circulating water filled in the internal space.

(30) The water sterilization apparatus, wherein at least one of the body and cover is made of a material that transmits visible light therethrough.

(31) The water sterilization apparatus, wherein at least one of the body and cover is made of a material that does not transmit ultraviolet light therethrough.

(32) The water sterilization apparatus, wherein the cover is adapted to cover outer lateral faces of the body.

(33) The water sterilization apparatus, wherein the body has a drain hole for water.

When the level of water is too high, water can be drained via the drain hole for water. By this, the first and second contacts and the third and fourth contacts can be protected and will not be shorted, the internal elements are protected, and users can also be protected.

(34) The water sterilization apparatus, wherein a wavelength conversion material for converting ultraviolet light into visible light is provided onto at least one of the following: the light source, the cover, and the inner lateral face of the body.

(35) The water sterilization apparatus, further comprising: a manually driven generator.

(36) The water sterilization apparatus, wherein the body includes a magnetic unit having a magnetic field, and wherein the cover includes a switch in a space influenced by the magnetic field of the magnetic unit in the body.

(37) The water sterilization apparatus, wherein the switch is a reed switch.

A water sterilization apparatus according to an embodiment of the present disclosure safely sterilizes water.

A water sterilization apparatus according to another embodiment of the present disclosure can perform water sterilization with reduced power.

A water sterilization apparatus according to another embodiment of the present disclosure is configured to have the first to fourth contacts in the cover and body, which in turn leads to very good durability and high safety on electrical accidents including shocks.

A water sterilization apparatus according to another embodiment of the present disclosure includes the light source and the circulator that do not need to be waterproofing, such that durability of the apparatus is very good, and price of parts is low.

A water sterilization apparatus according to another embodiment of the present disclosure is configured to have electrically separable body and cover, making it easy to wash the body.

What is claimed is:

1. A sterilization apparatus comprising:
a semiconductor UV (ultraviolet) light emitting diode;
a case including an upper section with an internal space and an entrance opening, a bottom face opposite to the entrance opening, and a lateral face connecting the bottom face and the upper section;
a container having an internal space, the container arranged between the entrance opening and the bottom face of the case, and adapted to receive ultraviolet light therein; and
an alarm unit adapted to emit visible light,
wherein the semiconductor ultraviolet light emitting diode and the alarm unit are arranged in the internal space of the case,
wherein the bottom face comprises a material that does not transmit ultraviolet light, and
wherein the container comprises a material that is light-transmittable to the visible light from the alarm unit and prevents the ultraviolet light emitted from the semiconductor ultraviolet light emitting diode from escaping to the outside of the container.

2. The sterilization apparatus according to claim 1, wherein the container is detachable between the upper section and bottom face of the case.

3. The sterilization apparatus according to claim 1, wherein the bottom face includes a UV-absorbing layer.

4. The sterilization apparatus according to claim 1, wherein the lateral face is configured not to transmit ultraviolet light therethrough.

5. The sterilization apparatus according to claim 4, wherein the lateral face includes a UV-absorbing layer.

6. The sterilization apparatus according to claim 1, wherein the internal space of the case includes a generator.

7. The sterilization apparatus according to claim 6, wherein the internal space of the case includes a battery.

8. The sterilization apparatus according to claim 1, wherein the entrance opening includes a UV-transmitting plate.

\* \* \* \* \*